United States Patent [19]

Sullivan et al.

[11] Patent Number: 5,041,763

[45] Date of Patent: Aug. 20, 1991

[54] CIRCUIT AND METHOD FOR IMPROVED DIMMING OF GAS DISCHARGE LAMPS

[75] Inventors: Charles R. Sullivan; Joel S. Spira, both of Coopersburg; David G. Luchaco, Macungie; Scott R. Jurell, Hellerton; Eric R. Motto, Center Valley, all of Pa.

[73] Assignee: Lutron Electronics Co., Inc., Coopersburg, Pa.

[21] Appl. No.: 553,201

[22] Filed: Jul. 13, 1990

Related U.S. Application Data

[63] Continuation-in-part of Ser. No. 455,644, Dec. 22, 1989.

[51] Int. Cl.$^5$ ............................................. H05B 41/38
[52] U.S. Cl. ..................................... 315/176; 315/307; 315/DIG. 4
[58] Field of Search ............... 315/160, 171, 174, 175, 315/176, 227 R, 283, 291, 297, 301, 307, 308, 311, DIG. 4

[56] References Cited

U.S. PATENT DOCUMENTS 4,562,382 12/1985 Elliot ................................... 315/219
4,633,161 12/1986 Callahan et al. ..................... 323/252

Primary Examiner—David Mis
Attorney, Agent, or Firm—Seidel, Gonda, Lavorgna & Monaco

[57] ABSTRACT

A dimming circuit provides power from an ac source to a compact fluorescent lamp. The circuit generally includes a resonant circuit driven by a high-frequency switching inverter and a current feedback control system. The circuit is essentially an ac current source of unusually high impedance and provides substantially symmetrical high-frequency current to the lamp. This allows flicker-free dimming of compact fluorescent lamps over a wide range with good light output stability. A small amount of dc or low-frequency ac current may be simultaneously provided to the lamp. The resulting composite current waveform flowing through the lamp substantially eliminates visible striations over a dimming range from about 100% to 1% of full light output.

107 Claims, 10 Drawing Sheets

CIRCUIT AND METHOD FOR IMPROVED DIMMING OF GAS DISCHARGE LAMPS

RELATED APPLICATIONS

This application is a continuation-in-part of copending application Ser. No. 455,644, filed Dec. 22, 1989 entitled "Circuit for Dimming Gas Discharge Lamps Without Introducing Striations", which is assigned to the same assignee as the present invention. This application is related to co-pending application Ser. No. 353,984, filed May 18, 1989; Ser. No. 450,185, filed Dec. 12, 1989; and Ser. No. 543,271; filed June 25, 1990.

BACKGROUND OF THE INVENTION

1. Field of the Invention

This invention pertains to dimming gas discharge lamps and, more particularly, to dimming fluorescent and compact fluorescent lamps.

2. Description of the Related Art

A gas discharge lamp converts electrical energy into visible energy with high efficiency. A gas discharge lamp is generally an elongated gas-filled (usually low pressure mercury vapor) tube having electrodes at each end. Each electrode is formed from a resistive filament (usually tungsten) coated with a thermionically emissive material, such as a mixture of alkaline earth oxides.

The steady-state operation of a gas discharge lamp is as follows: Voltage is applied across the resistive filaments, heating the electrodes to a temperature sufficient to cause thermionic emission of electrons into the discharge tube. A voltage applied between the electrodes accelerates the electrons toward the anode. En route to the anode, the electrons collide with gas atoms to produce positive ions and additional electrons, forming in the tube a gas plasma of positive and negative charge carriers. The electrons continue to stream toward the anode and the positive ions toward the cathode, sustaining an electric discharge in the tube and further heating the electrodes. If the applied power is ac, the electrodes reverse polarity on alternate half cycles.

The discharge causes the emission of radiation having a wavelength dependent upon the particular fill gas and the electrical parameters of the discharge. Because each collision produces additional electrons and ions, increases in the arc current can cause the voltage between the lamp electrodes to decrease, a characteristic known as "negative resistance." Operation of the lamp is inherently unstable, due to this negative resistance characteristic, and current between the electrodes must be limited by external means to avoid damaging the lamp.

Gas discharge lamps, including fluorescent lamps, are designed to deliver their full rated, or "nominal", light output at a specified RMS lamp current value. In this specification and the attached claims, the RMS current value at which a lamp is designed to deliver its full rated light output will be referred to as the "nominal" value of the lamp current.

Fluorescent gas discharge lamps include a phosphor coating on the inside of the tubular housing, and the excitation of this coating by radiation from the discharge provides the visible light output. Conventional fluorescent lamps are generally straight elongated tubes of essentially circular cross section with varying outside diameters ranging between about one and one and one-half inches.

Compact fluorescent lamps differ from conventional fluorescent lamps in that they are constructed of smaller diameter tubing, having an outside diameter of less than about seven-eighths of an inch. Also, the lamps are compact in part because the tubing has multiple small radius bends to fold back on itself in such a manner as to achieve a compact shape.

Dimming of gas discharge lamps is well known. A circuit for dimming a conventional fluorescent gas discharge lamp is disclosed in U.S. Pat. No. 3,927,345, issued Dec. 16, 1975, to Licata et al., incorporated herein by reference. Licata discloses a phase control dimming circuit which provides phase controlled voltage from a 60 Hz ac source to a fluorescent lamp in series with an inductive ballast. The dimming circuit employs a bi-directional triode-type thyristor (triac) as the main switching device and includes a dc compensation circuit to ensure symmetrical triac firing delays in each half cycle of power flow from the ac source. There is no current through the lamp during the triac firing delay. Symmetrically firing the triac prevents dc current from flowing through the lamp, which can cause the lamp to flicker and can cause saturation of the inductive ballast. The circuit operates over a dimming range from about 100% to 50% of full light output. Below about 50% light output, the electric discharge cannot be sustained, because the triac firing delay is longer than the de-ionization time of the gas plasma in the discharge tube.

Robertson Transformers Company of Chicago, Ill., makes a lamp ballast of this type specifically designed to operate compact fluorescent lamps. The ballast has limited dimming range due to the aforementioned triac firing delay and generally cannot dim below 40% of full light output.

U.S. Pat. No. 4,207,498, issued June 10, 1980, to Spira et al., discloses a dimming system that includes a central inverter for providing a substantially symmetrical 23 kHz ac current through the lamp. The lamp can be dimmed over a range from 100% to 1% of full light output by adjusting the amplitude of the inverter output. The use of high-frequency ac current also may increase the efficacy of the lamp by as much as 20%. At low light levels (less than about 30% of full light output), however, the lamp tends to "striate"; i.e., to break up into alternating bands of bright and dim areas along the length of the tube. This limits the utility of this type of system for dimming over a wide range of light output.

Previous attempts at dimming compact fluorescent lamps have not been entirely successful. The best known method is embodied in a product called HiLume ®, manufactured by Lutron Electronics Co., Inc. of Coopersburg, Pa. The operation of this product is described in U.S. Pat. No. 3,824,428, issued July 16, 1974, to Spira et al. and, U.S. Pat. No. 4,663,570, issued May 5, 1987, to Luchaco et al., incorporated herein by reference. This product allows dimming of compact fluorescent lamps to about 15% of their nominal light output. However, below this light level, the lamps exhibit an annoying flickering characteristic which makes them unsuitable for illumination usage.

Another known dimming control for compact fluorescent lamps is manufactured by Innovative Industries of Tampa, Fla. This control can operate the lamps to light levels below 15% without flicker, but suffers from poor stability of lamp arc current when operated below about 40% of nominal light output. The lamp arc current and therefore the light output of the lamp varies over a wide range at a given setting of the dimmer. For example, when operating a 26 watt quad tube T4 lamp, with an outside tube diameter of about one-half inch, this variation can be as much as from 4.7 milliamperes to 13.9 milliamperes when the lamp temperature varies over the range from normal room temperature of about 25° C. to its normal operating temperature of about 50° C. The wide variation of light output which results from this range of arc currents is unacceptable in practical use.

Specifically, if the lamp is initially at room temperature when it is set to a desired light level, the light at this setting could increase to as much as about three times the initial light level when the lamp is warmed up to its normal operating temperature. If the lamp is initially at some equilibrium operating temperature and then is adjusted to a lower light level, subsequent cooling of the lamp causes the light level to drop even lower, possibly even extinguishing the arc. This makes it very difficult to obtain a desired light level as required by the particular needs of the system user.

SUMMARY OF THE INVENTION

The present invention provides a dimming control which provides stable operation of compact fluorescent lamps without flicker or striations over a range from about 100% to 1% of nominal light output.

One aspect of the present invention provides for dimming of compact fluorescent lamps to below about 15% of nominal light output without flicker by providing a substantially symmetrical high-frequency ac waveform to operate the lamp. In a symmetrical ac waveform, the duration, amplitude, and shape of the positive and negative half cycles are substantially the same.

Another aspect of the present invention provides for improved stability of light output at low light levels when dimming compact fluorescent lamps below about 40% of nominal light output by providing an unusually high output impedance characteristic for the lamp current source. This impedance is greater than about 5,000 ohms, and insures stable operation of these compact fluorescent lamps, which exhibit an unexpectedly high value of negative resistance at low light levels compared to conventional fluorescent lamps.

One embodiment of the present invention provides a means of achieving this unusually high output impedance by a combination of passive series impedance elements and feedback control of the lamp arc current. This combination allows the passive impedance elements to have a moderate value of impedance, so that they are physically small and have low energy loss, while the current feedback system has a relatively low gain and improved stability, compared to the use of either method alone.

In another embodiment of the present invention, the dimming circuit generally provides a high-frequency current to the electrodes of a fluorescent lamp to initiate and maintain an electric discharge through the lamp and, simultaneously, provide a small amount of dc current to the electrodes to produce a composite current waveform through the lamp. The dc current is small enough that it does not produce adverse effects that are associated with operating lamps on dc and asymmetrical waveforms, but is sufficient to significantly reduce visible striations in the lamp. Alternatively, the dc component can be replaced by a low-frequency ac component.

In another embodiment of the present invention, a method for dimming fluorescent lamps consists of providing to the lamp a composite currant waveform including ac and dc current components. This composite waveform is particularly advantageous in compact fluorescent lamps when the ac component of current is a substantially symmetrical high-frequency waveform. The dc component can be either positive or negative and is preferably substantially smaller in magnitude than the ac component. Alternatively, the dc component can be replaced by a low-frequency ac component.

For purposes of this specification and the appended claims, the term "dc" refers to a voltage or current waveform that is unidirectional and can be either pulsating or non-pulsating. The term "ac" refers to a voltage or current waveform which reverses polarity at regularly recurring intervals of time and has alternately positive and negative values. The term "dc component" refers to the average value of an ac or dc waveform. The term "ac component" refers to that portion of an ac or dc waveform remaining after its dc component has been subtracted.

DETAILED DESCRIPTION OF THE PRESENT INVENTION

The resolution of the deficiencies of flicker, unstable light output and striations in dimming systems for compact fluorescent lamps is not obvious.

For example, the HiLume ® product described above, is available for conventional fluorescent lamps having a tubular shape and diameters down to about one inch. The performance of these lamps extends to 1% of nominal light output with no flicker and good light output stability, so the flicker observed below 15% nominal light output when this product is used to dim a compact fluorescent source is quite unexpected.

Our investigation indicates that the flicker in compact fluorescent sources is related to the presence of anode oscillations in the lamp. Anode oscillations are a well-known phenomena in gas discharge lamps which are operated on dc, or on ac with a frequency which is slow with respect to the de-ionization time of the lamp plasma. However, it is generally understood that operating a lamp at a high frequency eliminates anode oscillations. Since the HiLume ® product operates at such a high frequency, approximately 27 kHz, the presence of anode oscillations in the compact fluorescent lamps was unexpected.

Figure 1:
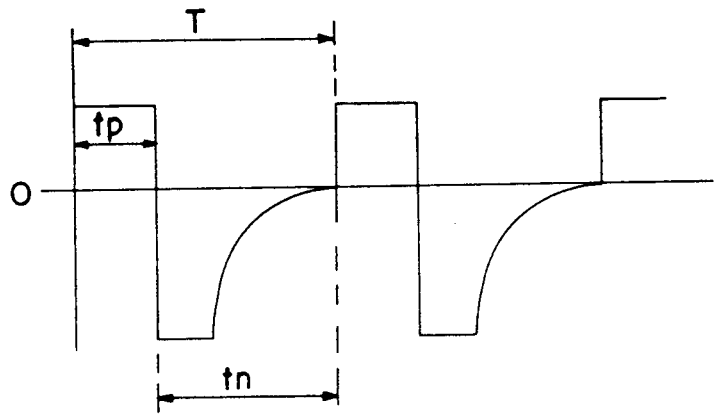
FIG. 1 shows an asymmetrical waveform of a prior art dimming system.

The HiLume ® product provides a high-frequency ac current to operate the lamp, but this current is not symmetrical. FIG. 1 is a diagram of the HiLume ® waveform at low light output levels. Clearly, the waveform is not symmetrical, as both the duration and the amplitude of the positive and negative half cycles are quite different. Note, however, that the area under the positive half cycle is always equal to the area under the negative half cycle, so that this is a pure ac waveform, with no dc component. The asymmetrical character of this waveform is advantageous with conventional fluorescent lamps with a diameter of one inch or more, as it gives very smooth dimming to light levels of 1% or less with no flicker or visible striations. However, we have found that this asymmetrical waveform induces anode oscillations in compact fluorescent lamps, in spite of the high operating frequency of 27 kHz, and this causes the lamps to flicker below about 15% of nominal light output.

According to our experiments, a difference in the duration of the positive and negative half cycles of more than 10% of the duration of one full cycle will induce anode oscillations and flicker in compact fluorescent lamps. For example, if the lamp is operated with a rectangular waveform having a total duration of 100 μsec. for one full cycle, then the positive half cycle (or the negative half cycle) must have a duration between about 45 and 55 μsec. to avoid anode oscillations and flicker. Therefore, one aspect of our invention is that a compact fluorescent lamp must be operated with a substantially symmetrical high-frequency waveform to avoid anode oscillations and subsequent flicker at low light levels.

High frequency is defined as a frequency greater than the reciprocal of the lamp de-ionization time. For compact fluorescent lamps the de-ionization time is less than about 200 μsec., so a high frequency would be greater than about 5 kHZ.

The Innovative Industries prior art dimming control is unsuitable because it has poor stability of light output at light levels below about 40% of nominal output. However, it does not exhibit the flicker phenomena described above, since it uses a substantially symmetrical current waveform to operate the lamp.

Lamp light output stability is generally related to the quality of the current source used to operate the lamp. Current source quality is described numerically by a quantity called its output impedance. Output impedance is defined as the ratio of the change in RMS output voltage divided by the corresponding change in RMS output current, and has the units of ohms. Therefore, a current source which exhibits a change in current level of 0.001 amperes as a result of a change in output voltage of 1 volt would have an output impedance of 1 volt divided by 0.001 amperes or 1,000 ohms.

Dimming gas discharge lamps requires a higher output impedance than simply operating them at full nominal output. Stable operation of most gas discharge lamps at full nominal output can be obtained with an output impedance of less than about 1,000 ohms. Dimming the lamp requires a higher output impedance in order to insure stability throughout the dimming range. The Robertson ballast achieves dimming down to about 40% of maximum light output with an output impedance of about 1,500 ohms. Larger dimming ranges require higher output impedances. For example, the HiLume ® prior art unit can operate conventional fluorescent lamps stably to less than 1% of nominal light output, and it exhibits an output impedance on the order of 3,500 ohms. However, as previously described, due to its asymmetrical output waveform, this unit cannot operate compact fluorescent lamps below about 15% of nominal light output without flicker.

The Innovative Industries prior art unit exhibits an output impedance on the order of 3,200 ohms. It can operate compact fluorescent lamps without flicker, but suffers from a more than three to one variation in arc current as the lamp warms up or cools down. This is objectionable because it results in a wide variation of the lamp light output as the lamp warms up. Since the HiLume ® unit exhibits very good arc current and light output stability on the conventional fluorescent lamps, and the output impedance of the Innovative Industries unit is somewhat less than but comparable to the value for the HiLume ® unit, the large variations in lamp arc current and light output exhibited by the Innovative Industries prior art are quite unexpected. We believe that the reason this unexpected result occurs is that the compact fluorescent lamps exhibit a much larger value of negative resistance through the dimming range, and this demands an unexpectedly large value of output impedance to assure acceptable stability of lamp arc current and light output.

Figure 2:
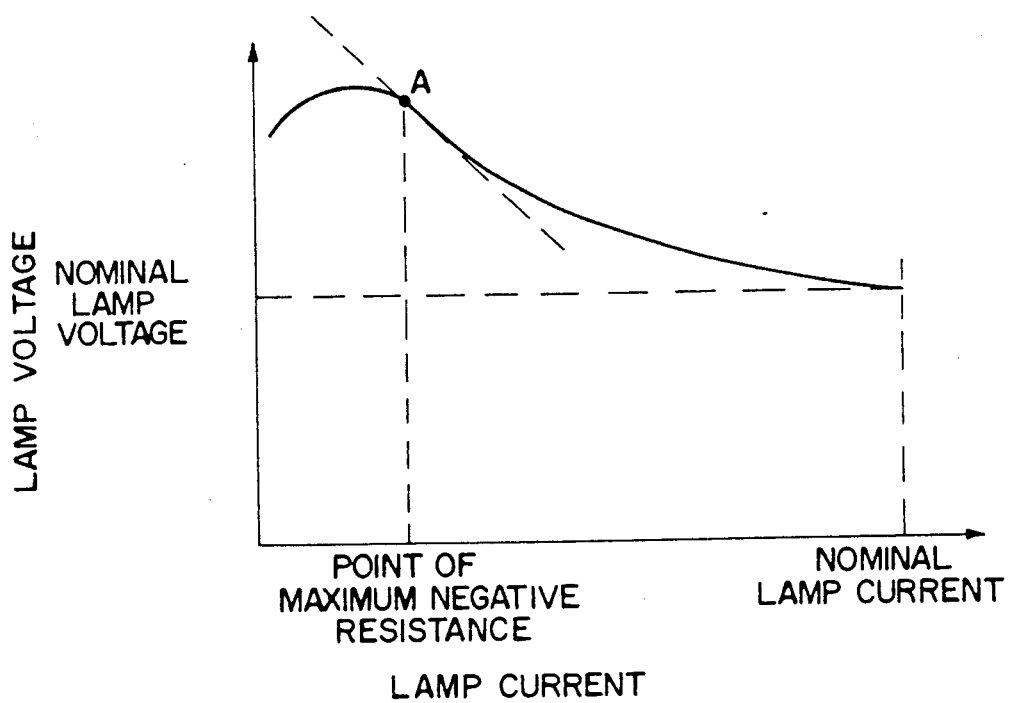
FIG. 2 is a voltage/current characteristic curve for a typical fluorescent lamp.

FIG. 2 is a plot of the voltage/current characteristic of a typical fluorescent lamp. The lamp incremental resistance at any operating point on this curve is defined as the slope of the curve at that point. From this, one can see that the lamp incremental resistance is positive at very low currents, then becomes zero at a maximum voltage point, and goes rapidly negative as current increases still further. Clearly, there exists a point at which the lamp incremental resistance achieves its maximum negative value, and this point is marked A in FIG. 2. The point of maximum negative resistance is the operating point where the lamp is least stable and most likely to exhibit variations in arc current and light output. Therefore, measurements of circuit output impedance should be taken at the point of maximum negative resistance of the lamps, to be a proper indicator of lamp operating stability.

Conventional fluorescent lamps exhibit a maximum negative resistance of less than about 250 ohms and this point occurs at about 25% of nominal lamp arc current or greater. With these lamps, the HiLume ® prior art unit operates stably to 1% light output or less, with an output impedance of 3,500 ohms at the point of maximum lamp negative resistance.

Unexpectedly, compact fluorescent lamps exhibit a maximum negative resistance of greater than about 330 ohms and this point occurs at about 10% of nominal lamp arc current or less. Therefore, we have found that it requires an output impedance of at least 5,000 ohms to insure stable operation of compact fluorescent lamps at low light output levels.

To be commercially acceptable, a light output variation of about two to one or less is necessary. Therefore, another aspect of our invention is that a compact fluorescent lamp must be operated from a source having an unusually high output impedance of greater than about 5,000 ohms at the point of maximum lamp negative resistance.

We believe that these unexpected characteristics of compact fluorescent lamps, the flicker below 15% on asymmetrical current waveforms and the unusually high value of maximum negative resistance, are due to the physical construction of the lamps, particularly the small diameter of the tubing. Whereas conventional lamps are constructed of tubes of one inch diameter or more, compact fluorescent lamps are constructed of tubes of less than about seven-eighths of an inch outside diameter. Small tube diameter is known to cause short plasma de-ionization time, and therefore result in a less stable discharge. Also, compact fluorescent lamps often contain many bends of small radius and/or constrictions, compared to conventional lamps with a diameter of one inch or more. We believe that these perturbations of the discharge also contribute to reduced arc stability, with high values of maximum negative resistance and an increased tendency to flicker as a result.

Figure 3:
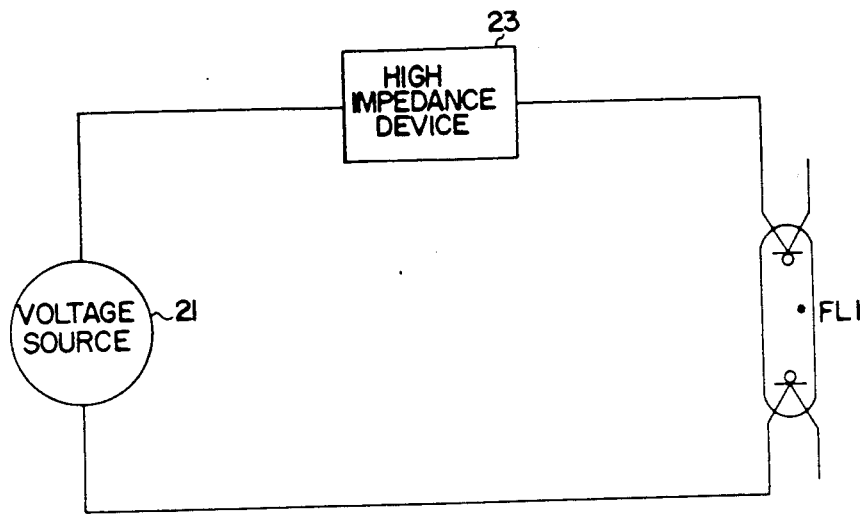
FIG. 3 is a simplified circuit schematic of one embodiment of the present invention.

According to one embodiment of the present invention for operating a compact fluorescent lamp, particularly at low light levels, the invention includes a voltage source 21 in series with a high-impedance device 23, as shown in FIG. 3. The impedance of the high-impedance device is greater than about 5,000 ohms.

The output of voltage source 21 can be either ac or dc and may consist of any number of various wave shape components. The voltage source may include such circuits as dc voltage multipliers or the like, although, the exact nature of the voltage source is not crucial to the invention herein involved, and may even be external to the circuit itself. The voltage source may otherwise include switching converters or inverters, or pulse-duration-modulation circuits, among other things.

High-impedance device 23 may be composed of any number or combination of resistive or reactive components having an impedance greater than about 5,000 ohms. A highly resistive impedance may tend to dissipate and damp out transient instabilities in the lamp, which may otherwise cause lamp flicker and/or visible striations. Light output levels below one-half percent have been achieved using a steady dc source in series with a large resistor. Other currents or voltages may be provided to the lamp in addition to the current through high-impedance device 23.

High-impedance device 23 may alternatively be composed entirely of reactive components. This embodiment has an advantage over the purely resistive impedance described above in that the reactive components dissipate less power. A resonant LC combination driven at or near its peak response frequency is particularly preferred for high-efficiency operation of the lamp at low light levels. In this specification and the appended claims, a resonant circuit is understood to have a single fundamental mode of resonance. The term "peak response frequency" refers to the frequency at which this fundamental resonance is maximized. High impedance device 23 may also be a purely inductive or capacitive impedance. Alternatively, high-impedance device 23 can be any passive or active circuit which limits current flow through the lamp and has an equivalent output impedance higher than about 5,000 ohms.

Figure 4:
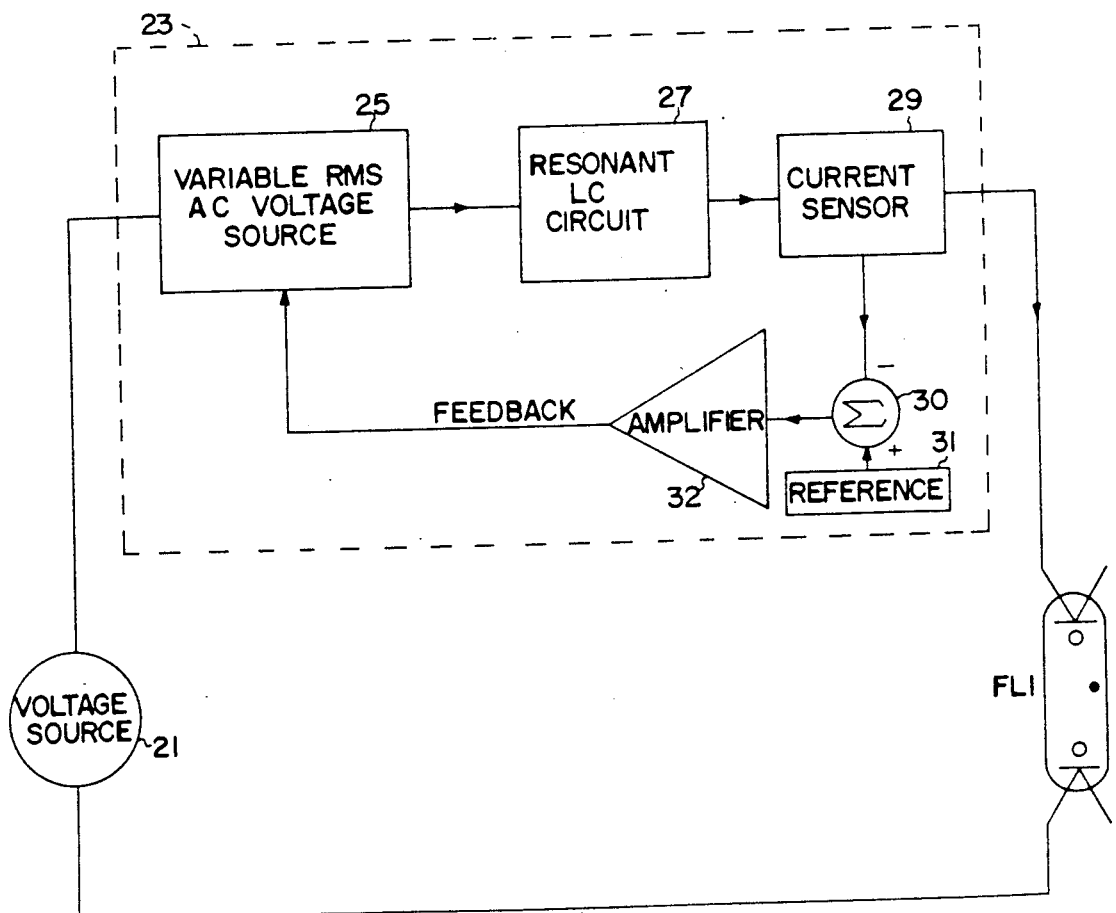
FIG. 4 is another embodiment of the invention as shown in FIG. 3.

FIG. 4 is a block diagram of a high-impedance device including both passive and active elements. Variable ac voltage source 25 provides az voltage to resonant LC circuit 27 at a frequency equal to or near its peak response frequency. The resonant circuit provides current to lamp FL1. Current sensor 29 senses the amount of current through the lamp and provides a signal to summing junction 30. Summing junction 30 compares this signal with the signal from reference 31 and provides an error signal proportional to the difference to amplifier 32. Amplifier 32 adjusts variable source 25 to reduce the difference between the signal from current sensor 29 and reference 31, thereby reducing the magnitude of variations in the current in lamp FL1 and increasing the circuit output impedance. Thus, the equivalent output impedance of this circuit is very high; much higher, in fact, than the impedance of resonant LC circuit 27 alone. A dimming circuit having a high-impedance device of this configuration with an equivalent output impedance of about 35,000 ohms was able to operate a compact fluorescent lamp at light levels below about 1%.

Variable voltage source 25 can be any ac source having a variable output voltage. This is preferably a pulse-duration-modulated inverter circuit for producing ac voltage pulses of variable duration. Alternatively element 25 may be a sinusoidal or square wave source of variable amplitude. In another embodiment, element 25 may be replaced with a constant-voltage source of variable frequency.

Resonant LC circuit 27 can alternatively be replaced with any combination of resistive or reactive components or may be omitted completely. However, with a relatively low impedance for element 27, the current sensor 29 must respond faster and amplifier 32 must have higher gain in order to maintain the same equivalent output impedance of high impedance device 23. As the speed of response and gain of the system is increased, it becomes more difficult to avoid oscillation and provide suitably stable operation. Alternatively, a relatively high value of impedance for the passive element (in this case resonant circuit 27) allows lower gain and slower response, but incurs more losses in the passive element.

Current sensor 29 may ba any device that produces a signal functionally related to a current flowing therethrough. This is preferably a low value resistor or a small transformer.

One disadvantage of using a substantially symmetrical high-frequency waveform to operate fluorescent lamps is the occurrence of visible striations along the length of the lamp tube. These striations may be stationary or they may move in one direction or the other at various velocities, and they are most commonly found when operating the lamp below about 30% of nominal light output. We have found that the addition of a small amount of dc current or low-frequency ac current can substantially reduce or eliminate these visible striations.

Figure 5A:
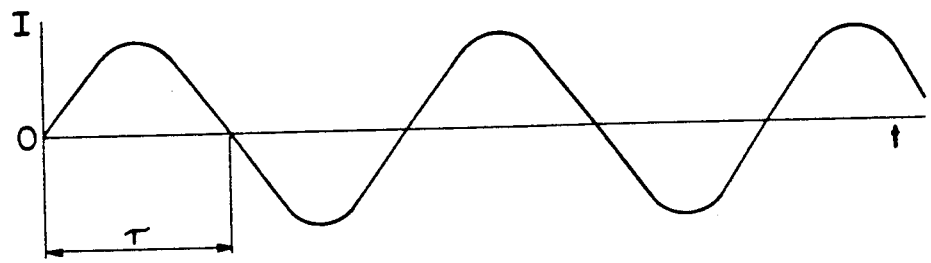
FIGS. 5A-5C is a graph of current flow through a compact fluorescent lamp according to the present invention.

Accordingly, FIG. 5A shows the ac component of current flow through a fluorescent lamp according to one embodiment of the present invention. The half-period $\tau$ is determined by the frequency of the sinusoidal current and is preferably shorter than the de-ionization time of the gas plasma. The RMS value of ac current to the lamp substantially determines the power and, therefore, the brightness of the lamp and is adjustable from a value approximately equal to the nominal operating current of the lamp, the value at which the nominal light output is obtained, to a substantially lower value.

Figure 5B:

FIG. 5B shows the dc component of current flow through the lamp. For illustrative purposes, the magnitude of the dc component is exaggerated with respect to the ac component. As a practical matter, for typical fluorescent lamps, a dc component of less than about 5% of the nominal lamp operating current is preferred.

Figure 5C:
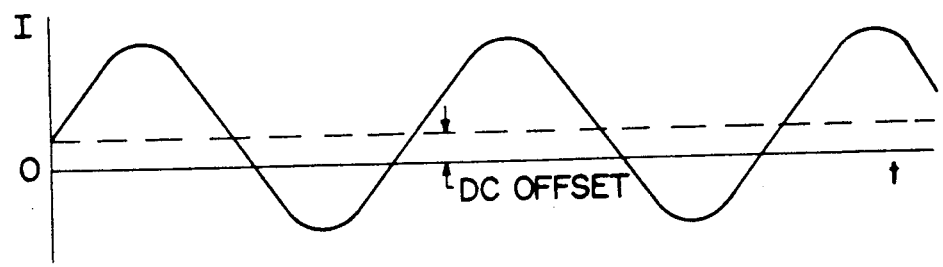

FIG. 5C shows the composite current waveform that flows through the lamp. The dc component offsets the ac component from the zero current level, causing a slightly asymmetric composite current waveform that substantially reduces lamp striations. The frequency o the ac component is preferably above 20 KHz, so as to avoid audible noise, although it is believed that lower frequencies will still produce the desired result.

Preferably, the dc component is smaller than about 5% of the nominal lamp operating current so as to avoid the aforementioned flickering and anode oscillation problems associated with operating gas discharge lamps on dc or asymmetric ac current. The polarity of the dc component may be either positive or negative.

In another embodiment of the present invention, the above described dc component of current through the lamp can be replaced by a low-frequency ac component. A chief advantage of operating the lamp in this fashion is that low-frequency ac sources are more readily available than dc sources.

The low-frequency current component is preferably substantially lower than the preferred 27 kHz frequency of the driving voltage. Frequencies in the range between 30 Hz and 150 Hz are preferred. Frequencies below 30 Hz may cause undesirable visible strobing of lamp brightness. Frequencies much above 150 Hz require increased amounts of low-frequency current to reduce striations, but frequencies up to at least about 5 kHz are still useful.

Figure 6:
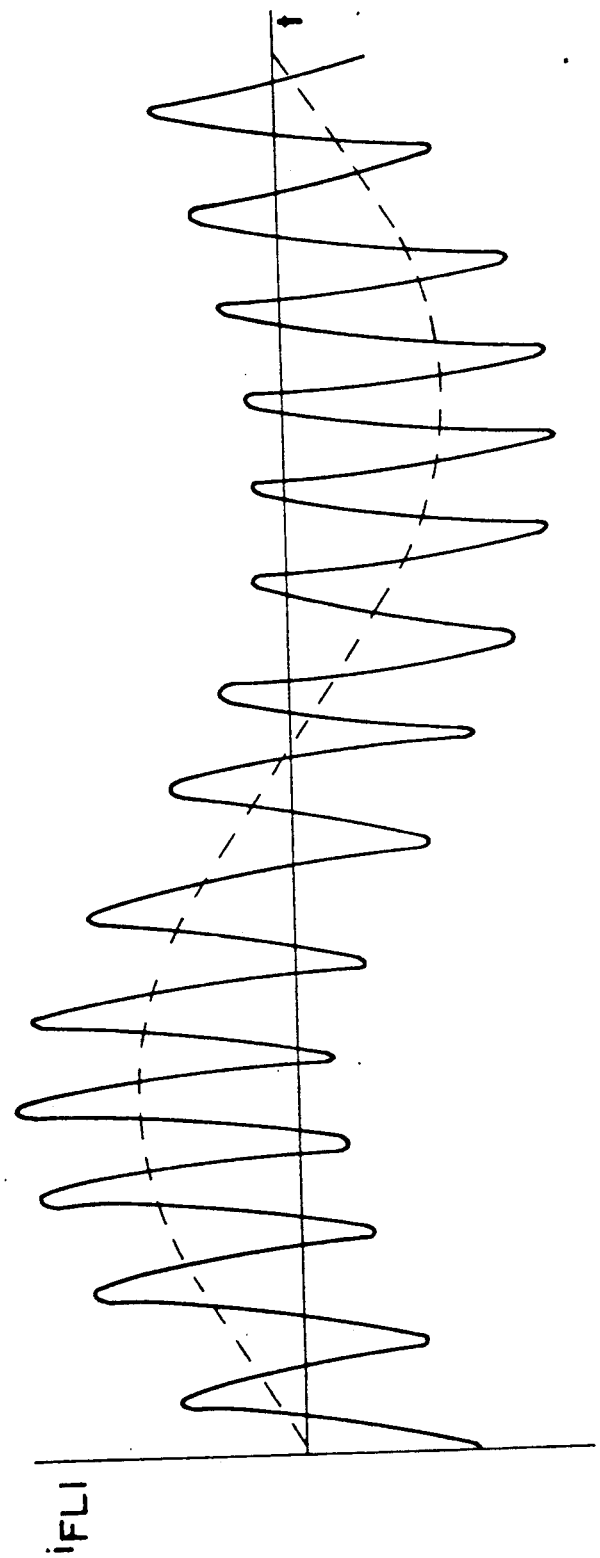
FIG. 6 is a composite current waveform having high-frequency and low-frequency ac components.

FIG. 6 shows a composite current waveform having both high-frequency and low-frequency ac components as described above. The composite waveform can be described as ac since it reverses polarity at regularly occurring intervals and has alternately positive and negative values. The magnitude and relative frequency of the low-frequency component is exaggerated for illustrative purposes.

The peak amplitude of the low-frequency component is preferably less than that of the high-frequency component, such that the composite waveform reverses polarity at a high-frequency over each low-frequency half-cycle. The dc component of the composite waveform as shown in FIG. 6 is preferably zero.

Figure 7:
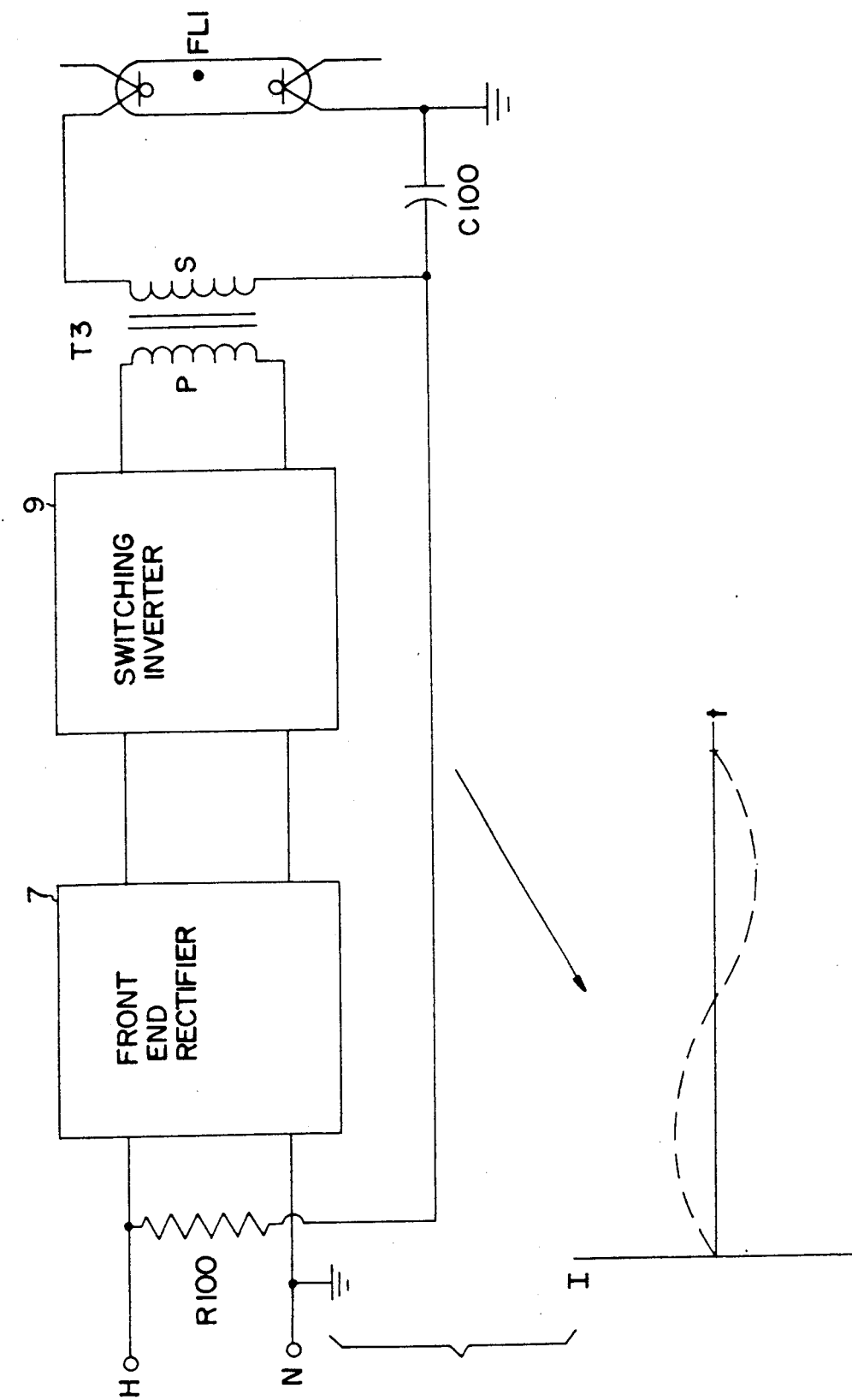
FIG. 7 is a simplified circuit schematic for producing the waveform of FIG. 6.

One convenient way of deriving a low-frequency alternating current is illustrated in FIG. 7. In FIG. 7, circuit elements given identical numbers are identical to those described below in connection with FIG. 9, 10, and 11. Thus, front end rectifier 7, switching inverter 9 and transformer T3 are identical to those elements as described hereinafter. In FIG. 7, a portion of the 60 Hz input current is tapped off from the hot input H by a resistor R100 between the hot input H and one side of the secondary of transformer T3, where it is added to the high-frequency alternating current supplied by the switching inverter 9 to the lamp. The value of R100 is chosen to provide any desired amplitude of the low-frequency component. A capacitor C100 is connected from the junction of R100 and the secondary of transformer T3 to ground. For purposes of this specification and the appended claims, when referring to electrical elements, the term "connected" means that there exists between two or more elements a conductive path, which may include additional elements not explicitly recited. C100 is chosen to provide a high ac impedance path to ground at 60 Hz so that the low-frequency alternating current injected into the secondary of transformer T3 flows through the lamp.

The low-frequency alternating current supplied to the lamp provides an ac offset, rather than a dc offset, to the high-frequency alternating current supplied to the lamp but still provides a degree of asymmetry to the high-frequency current sufficient to substantially reduce the occurrence of visible striations.

In addition to a 60 Hz sinusoidal low-frequency alternating current, other waveform shapes can be used, such as square wave, triangular, saw-tooth, etc. A square wave would, in effect, provide a positive dc offset during one half cycle and a negative dc offset during the other half cycle of the low-frequency alternating current, which would render the high-frequency current asymmetric during both half cycles.

Figure 8:
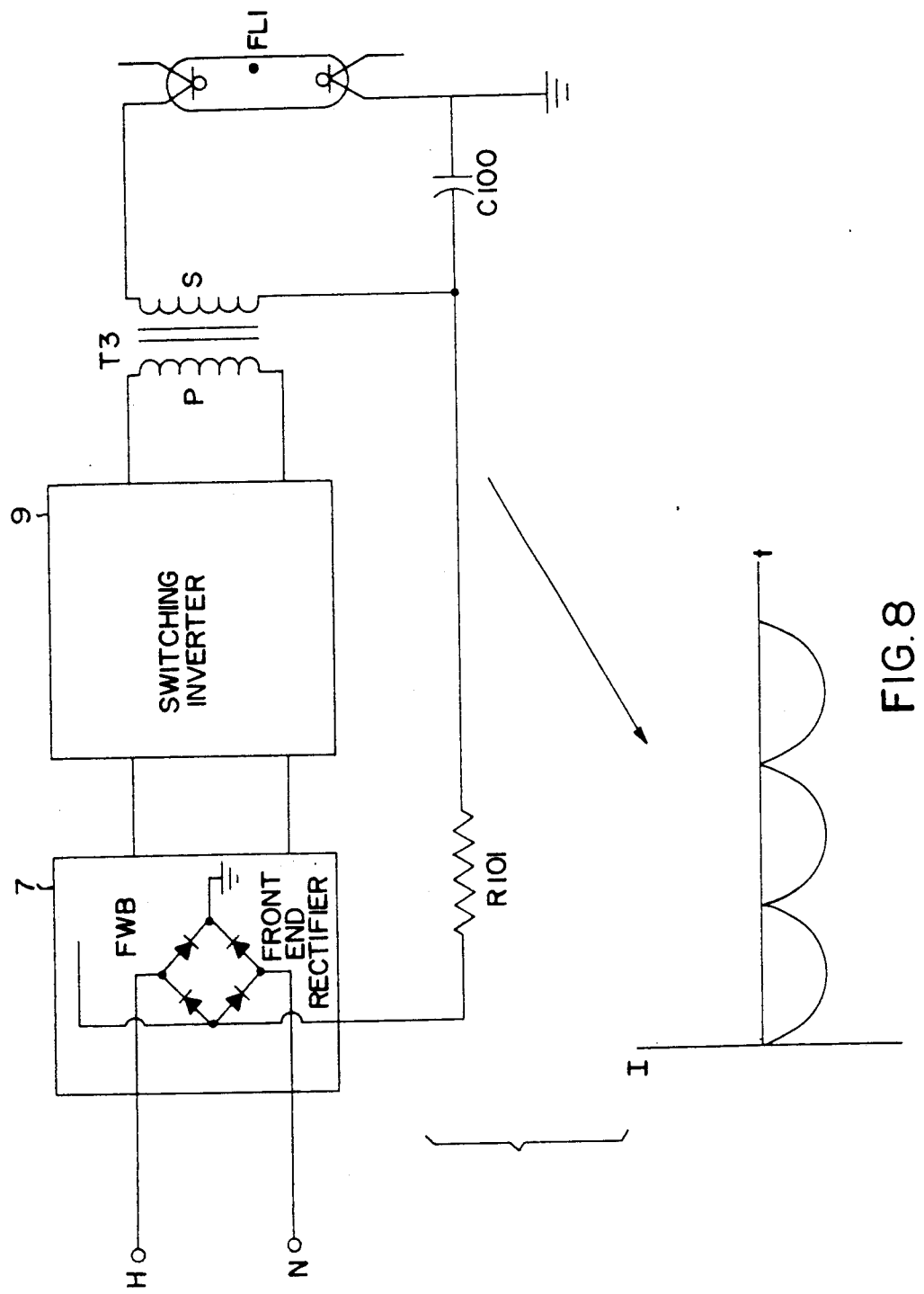
FIG. 8 is a simplified circuit schematic for providing pulsating, low-frequency dc current to a lamp.

Moreover, it is not necessary that either a constant direct current or a low-frequency alternating current be used to eliminate visible striations in compact fluorescent lamps. Alternatively, a pulsating dc current, such as the pulsating dc current from a full-wave rectifier, can be used. One circuit for providing a pulsating dc current is shown in FIG. 8. In that circuit, one terminal of the dc side of the diode bridge FWB in front end rectifier 7 is connected via resistor R101 to one terminal of the secondary of transformer T3, where it [s added to the high-frequency alternating current supplied to the lamp by switching inverter 9. The pulsating dc current waveform derived from diode bridge FWB is shown in FIG. 8 as a negative current, but it will be understood that a positive current would also impart the desired asymmetry to the high-frequency lamp current. The composite waveform provided to the lamp, in this case, would contain dc as well as low-frequency and high-frequency ac components.

Figure 9:
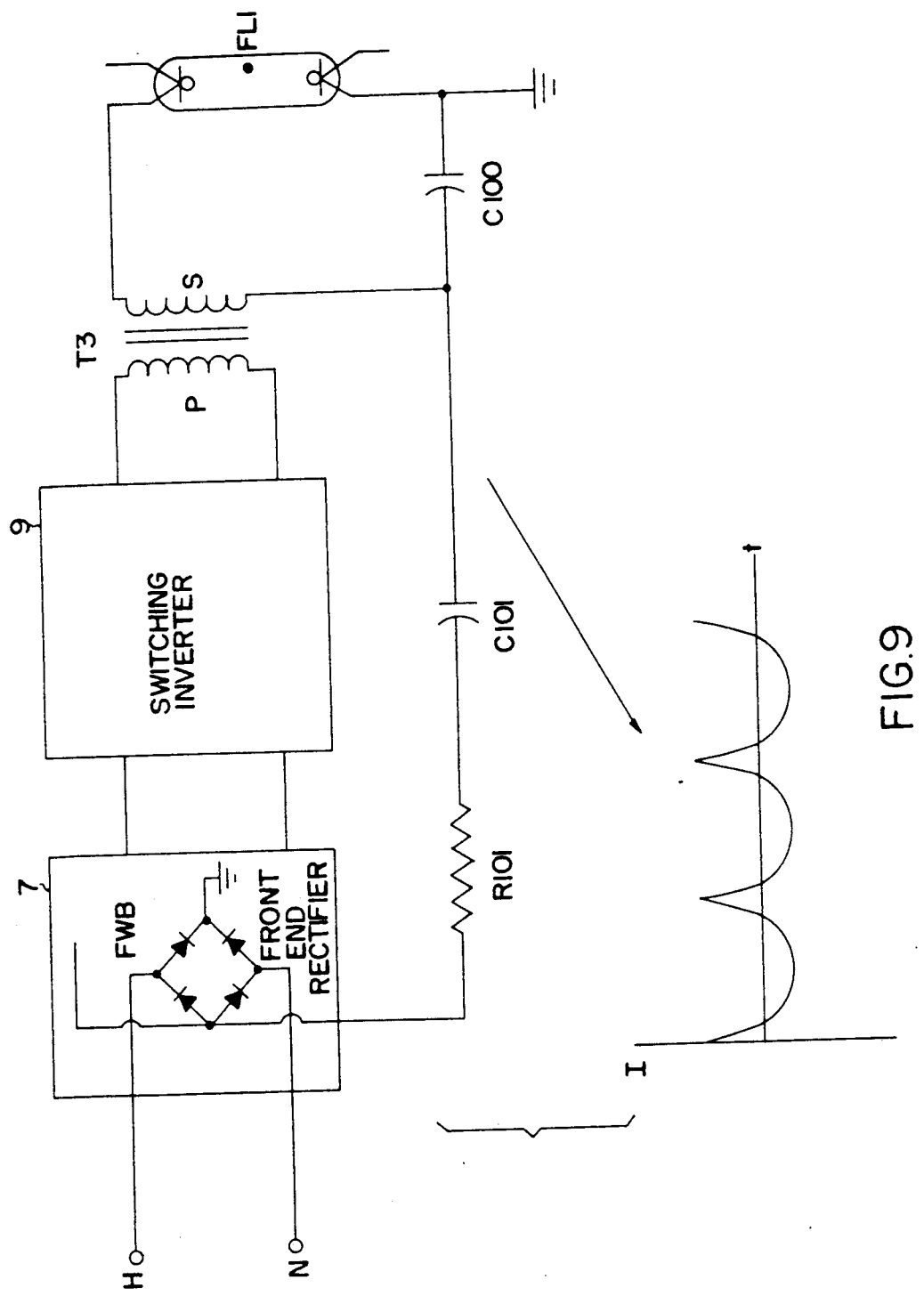
FIG. 9 is a simplified circuit schematic for providing pulsating, low-frequency, asymmetric ac current to a lamp.

The pulsating dc current derived from diode bridge FWB may also, if desired, be converted to an asymmetric low-frequency ac current by adding a dc blocking capacitor C101 in series with resistor R101, as shown in FIG. 9. The waveform of the low-frequency ac current is also shown in FIG. 9, and is essentially the same waveform as described above in connection with FIG. 8, but with a dc component of zero. It should be understood that the precise waveform and the precise frequency are not critical. It should also be understood that the single lamp shown can be replaced with a plurality of series or parallel connected lamps.

It should additionally be pointed out that the invention herein involved is not limited to the specific circuit or waveforms as described above. Alternatively, any type of current waveform having both ac and dc components may be provided to the lamp to eliminate visible striations.

Figure 10:
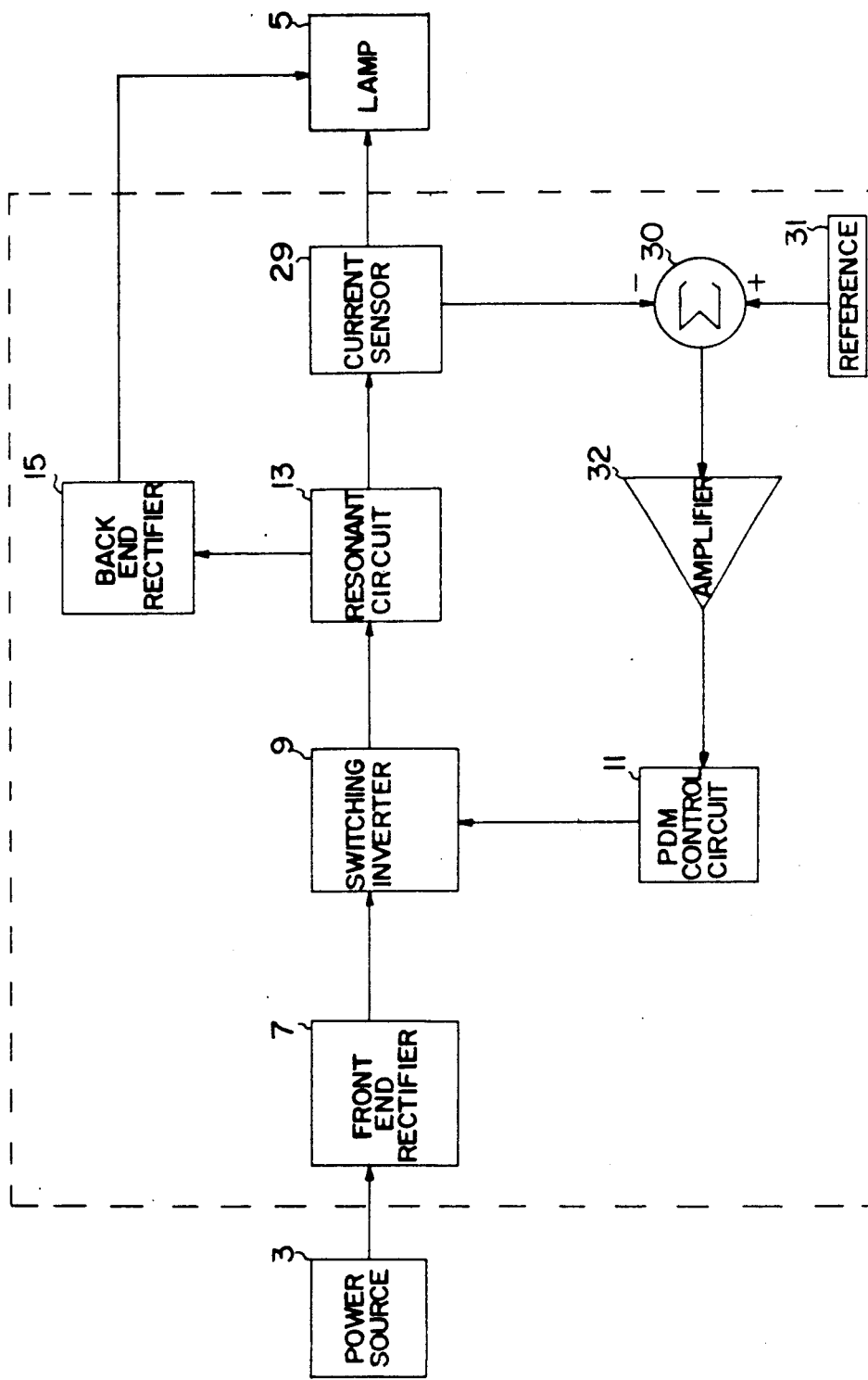
FIG. 10 is a block diagram of a dimming circuit of the present invention.

FIG. 10 shows a block diagram of a dimming circuit according to an embodiment of the present invention. The dimming circuit 1, enclosed in the dashed lines, provides a variable amount of power from sinusoidal power source 3 to a gas discharge lamp 5. The dimming circuit generally includes a front-end rectifier 7 to convert a typically low-frequency ac voltage from power source 3 into a dc voltage provided to switching inverter 9. Switching inverter 9 converts the dc voltage into a high-frequency ac voltage consisting of alternately inverted and non-inverted rectangular pulses of voltage having variable duration. Pulse duration modulation (PDM) circuit 11 provides a modulating voltage waveform to switching inverter 9 to control the duration of each pulse.

The high-frequency ac voltage from switching inverter 9 drives resonant circuit 13 so that it resonates substantially sinusoidally, with an amplitude determined by the amplitude and frequency of the driving voltage and the magnification factor Q of the resonant circuit. The resonant circuit is essentially a symmetrical high-frequency sinusoidal current source with a variable amplitude determined by the pulse duration of the driving voltage from switching inverter 9.

The current from resonant circuit 13 is provided to lamp 5 to strike and maintain a stable electric discharge over a range of selectable power levels. Simultaneously, back-end rectifier 15 rectifies a predetermined amount of current from resonant circuit 13 and provides it to lamp 5, adding to the current flow therethrough a dc component selected to minimize visible striations.

Current sensor 29 senses the amount of current through the lamp and provides a signal to summing junction 30. Summing junction 30 compares this signal with the signal from reference 31 and provides an error signal proportional to the difference to amplifier 32. Amplifier 32 adjusts PDM control circuit 11 to reduce the difference between the signal from current sensor 29 and reference 30, thereby reducing the magnitude of variations in the current in lamp FL1 and increasing the circuit output impedance.

Figure 11:
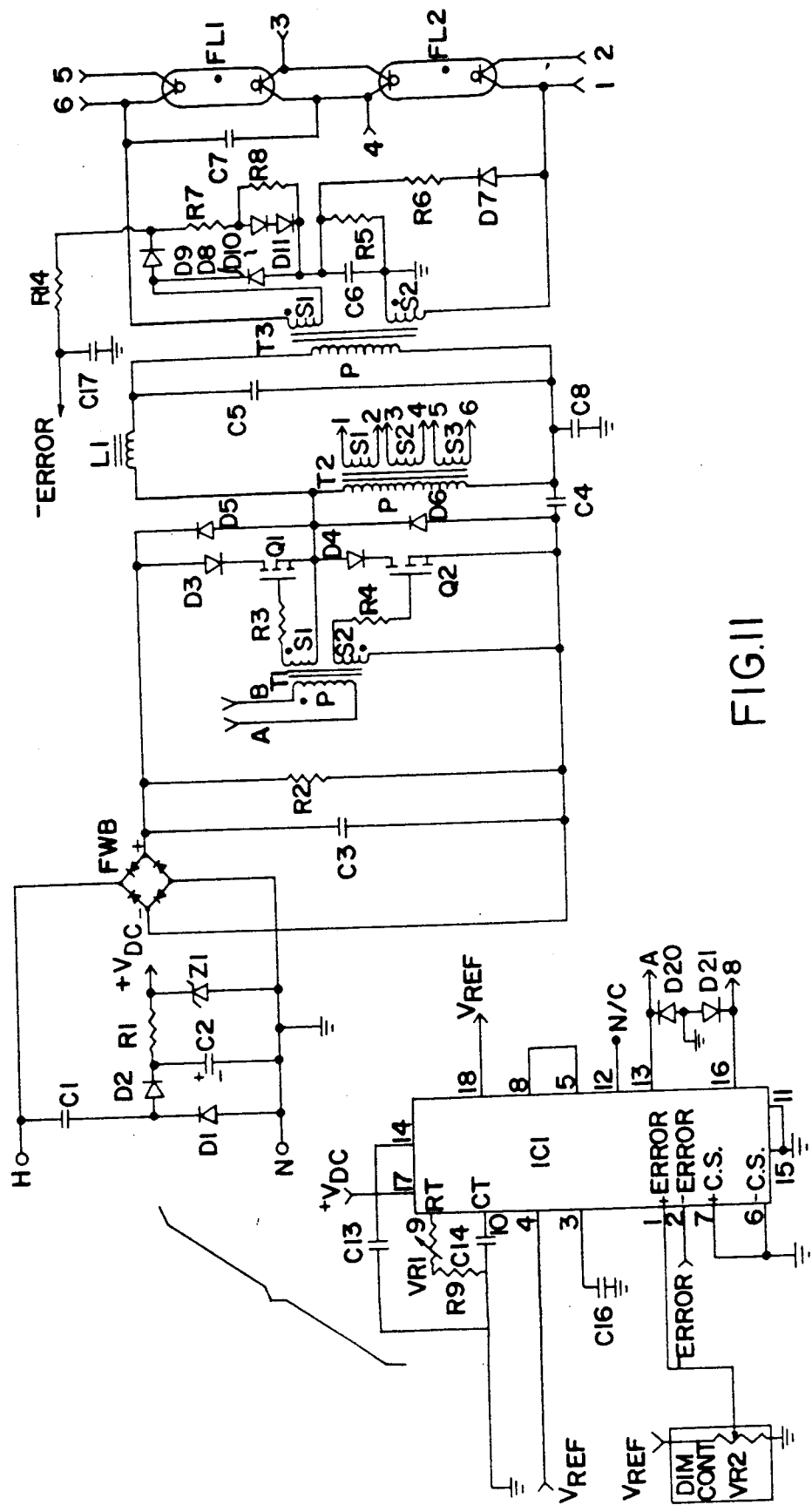
FIG. 11 is a circuit schematic of a dimming circuit of the present invention.

FIG. 11 is a circuit schematic of one embodiment of a dimming circuit according to the present invention. The circuit operates as follows: ac voltage is provided from a power source across hot (H) to neutral (N). Diodes D1 and D2, resistor R1, capacitors C1 and C2, and zener diode Z1 comprise a low voltage dc power supply. During each positive voltage half-cycle, current flows from hot through capacitor C1, diode D2, and capacitor C2 to neutral, charging capacitor C2 plus(+) to minus(−), as shown. Resistor R1 and zener diode Z1 regulate the output voltage that appears across zener diode Z1 so that the power supply is essentially a dc voltage source having a dc supply voltage approximately equal to the breakover voltage of zener diode Z1. Diode D1 provides a discharge path for capacitor C1 during each negative voltage half-cycle.

Full-wave-bridge FWB rectifies ac voltage from the power source and provides pulsating dc voltage across the output terminals (+) and (−). Pulsating dc is filtered by capacitor C3, which is connected across the output terminals of the full-wave bridge. Resistor R2 is in parallel with C3 and bleeds charge from it when power is removed. Diodes D3, D4, D5, and D6, MOSFETS Q1 and Q2, resistors R3 and R4, transformer T1, and capacitor C4 comprise a switching inverter for switching and inverting filtered dc voltage into a high-frequency ac driving voltage. During operation, capacitor C4 charges up to approximately half of the voltage across capacitor C3. When Q1 is conductive, a driving voltage is applied across the primary winding P of transformer T2 that is positive and equal to the voltage across C3 less the voltage across C4 (approximately half the voltage across C3). When Q2 is conductive, the driving voltage is inverted and equal to the voltage across C4. When Q1 and Q2 are alternately switched at a high-frequency (~27 kHz), rectangular pulses of ac driving voltage are produced having a peak-to-peak voltage substantially equal to the voltage across capacitor C3.

The driving frequency is preferably between 20 kHz and 50 kHz and is determined by the ac control voltage from the PDM circuit, IC1, discussed below. Frequencies below 20 kHz are in the human audible range and are therefore undesirable. Frequencies above 50 kHz are undesirable because they tend to cause high thermal dissipation in MOSFETS Q1 and Q2 and they increase the flow of leakage current through the capacitive impedance of the fixture wires to ground, thereby making operation at low light levels more difficult.

Resistors R3 and R4 damp oscillations which may otherwise occur due to the leakage inductance of secondary windings S1 and S2 of transformer T1 and gate capacitance of MOSFETS Q1 and Q2. Diodes D3 and D4 block reverse current from flowing through MOSFETS Q1 and Q2, respectively. Diodes D5 and D6 provide a commutation path for current flowing through Q2 and Q1, respectively.

Q1 and Q2 could be any type of semiconductor switch, such as FETS or bipolar transistors; however, MOSFETS, as shown, are preferred because of their fast switching ability and their relatively low gate current requirements. Alternatively, the switching inverter may be replaced with a less-expensive semiconductor dc frequency converter, which converts a non-pulsating dc voltage into a high-frequency pulsating dc voltage. An inverting type of oscillating circuit, which converts dc to ac, is preferred, however, since it provides reduced peak magnetic flux in the core of the power-carrying transformers for the same amount of transformed energy, and provides a more symmetric waveform.

Integrated circuit IC1, described below, receives voltage ($+V_{DC}$) from the dc power supply and provides an ac control voltage across the primary winding P of transformer T1 to control the conductivity of MOSFETS Q1 and Q2 and, accordingly, the duration of each rectangular pulse of driving voltage. Secondary windings S1 and S2 of transformer T1 are arranged so that voltage is applied to the gates of MOSFETS Q1 and Q2 in opposite polarities so that only one device may be conductive at any given time. Pulse-duration-modulated driving voltage is provided across primary P of transformer T2 and across the resonant circuit consisting of inductor L1 and capacitor C5 connected in series. The resonant circuit rings substantially sinusoidally at the driving frequency with an amplitude determined by the pulse duration of the driving voltage and the magnification factor Q of the resonant circuit. The magnification factor Q, in this case, is determined primarily by the impedance of lamps FL1 and FL2, which load the resonant circuit in parallel.

Loading the resonant circuit in parallel tends to stabilize operation of the gas discharge lamps. In particular, as current through the lamps increases, lamp conductivity increases, decreasing the magnification factor Q of the resonant circuit and, thereby, reducing its resonant response. Conversely, as the current through the lamps decreases, lamp conductivity decreases, increasing the magnification factor Q of the resonant circuit and, thereby, boosting its resonant response. The resonant circuit essentially behaves like an ac current source and provides high-frequency sinusoidal current through transformer T3 to lamps FL1 and FL2. The magnitude of the current is variable depending upon the pulse duration of the driving voltage, and is sufficient to strike and maintain an electric discharge in the lamps.

To further increase the stability of the resonant circuit, the frequency of the driving voltage (~27 kHz) is less than the peak response frequency of the resonant circuit (~33 kHz). Alternatively, damping could be added to the resonant circuit, reducing the magnification factor Q; however, this would reduce its efficiency and generate unwanted heat.

Capacitor C6, resistors R5 and R6, and diode D7 form a back end rectifier circuit for providing dc current through lamps FL1 and FL2 in series. Capacitor C6, connected between secondary windings S1 and S2 of transformer T3, is selected to pass substantially all high-frequency sinusoidal current from the resonant circuit to lamps FL1 and FL2. Resistor R6 allows dc current to flow through diode D7, providing a dc offset to capacitor C6 so that the sinusoidal current through lamps FL1 and FL2 receives a dc component of current, as determined by resistor R6. Resistor R5 is essentially a bleeder to discharge capacitor C6 when power is removed. Resistor R5 also limits the amount of dc offset on capacitor C6 when the conductivity of the lamps decreases at low power levels.

Earth ground is referenced between secondary windings S1 and S2 of transformer T3. The relative sizes of the secondary windings are selected to provide sufficient voltage with respect to ground to strike lamps FL1 and FL2 through the capacitance to ground of each lamp. They are also selected to balance the ground currents through each lamp so that the high-frequency sinusoidal current energizes the lamps equally. In this particular circuit, a compromise is necessary to achieve sufficient striking voltage and, thus, the ground current through lamp FL1 is slightly larger than that through FL2. To correct for this imbalance, capacitor C7 is provided in shunt with lamp FL1 to provide compensating current to lamp FL2. Capacitor C8 prevents high-frequency switching noise from MOSFETS Q1 and Q2 in the switching inverter from adversely affecting the light output of lamps FL1 and FL2.

Secondary windings S1, S2, and S3 of transformer T2 provide voltage to the filaments of lamps FL1 and FL2 to heat them. Primary winding P of transformer T2 receives pulse-duration-modulated voltage from the switching inverter circuit including MOSFETS Q1 and Q2. In addition, after Q1 is turned off and before Q2 is turned on, current through Q1 and inductor L1 commutates through diode D6, turning it on. This provides across primary winding P of transformer T2 an additional pulse of voltage, having an amplitude equal to the voltage across capacitor C4. Once the voltage across capacitor C5 reaches its peak, current reverses through inductor L1, and capacitor C5 discharges, turning diode D5 on. This provides across primary winding P a second pulse of voltage, having an amplitude equal and opposite to that of the first pulse. The two additional voltage pulses substantially occupy the period of time after Q1 is turned off and before Q2 is turned on. The circuit behaves similarly during the period after Q2 is turned off and before Q1 is turned on. The resultant high-frequency voltage across primary winding P has an RMS value that is substantially constant throughout the dimming range of the lamps. Thus, secondary windings S1, S2, and S3 also provide constant RMS voltage to heat the filaments of lamps FL1 and FL2 throughout the dimming range.

Integrated circuit IC1 is preferably an industry-standard SG3526 pulse duration modulation (PDM) integrated circuit. Internal operation of the integrated circuit is described in the Silicon General Product Catalog, 1989, Section 4, pp. 111-119, and Section 12, pp. 49-74, incorporated herein by reference. Pins 14 and 17 of IC1 are connected to +VDC for receiving low voltage dc power from the dc power supply circuit described previously. Capacitor C13 is a bypass capacitor to help maintain a steady dc voltage on pins 14 and 17. Capacitor C14 and resistors R9 and VR1 are connected to an internal oscillator through pins 9 and 10 of IC1 and set the modulation frequency. The combination of resistor R9 and variable resistor VR1 may optionally be replaced with a single fixed resistor, but the combination, as shown, is preferred as it allows easy adjustment of the modulation frequency.

The output the IC1 consists of alternate pulses of positive voltage provided on pins 13 and 16 (outputs A and B). This pulsating voltage .s provided across input terminals A and B of transformer T1 and controls the conductivity of MOSFETS Q1 and Q2. The duration of each pulse is preferably variable from zero to about 18 $\mu$s, the maximum pulse duration that ;till allows some dead time between pulses at the preferred modulation frequency ($\approx$27 KHz). This dead time can be increased by connecting an optional resistor (not shown between pin 11 and ground. Diodes D20 and D21, preferably Schottky diodes, prevent outputs A and B, respectively, from being pulled excessively negative by the magnetizing current of transformer T1.

Integrated circuit IC1 preferably includes an error amplifier for providing feedback control for the current through lamps FL1 and FL2. To the negative side of the error amplifier is provided a voltage (−ERROR) that corresponds to the actual lamp current. To the positive side of the error amplifier is provided a reference voltage (+ERROR) set by potentiometer VR2, which may be part of a dimming control, as shown. The output of the error amplifier controls the pulse duration of outputs A and B and, thus, controls the current through lamps FL1 and FL2. $V_{ref}$ is a tightly regulated 5V supply produced on pin 18 of integrated circuit IC1.

A current sensing circuit, comprising diodes D8, D9, D10, and D11, resistors R7, R8, and R14 and capacitor C17 provides a voltage (−ERROR) that is indicative of the lamp current. The current sensing circuit operates as follows: During each positive half-cycle of current flow ($i_{FL}$) through the lamps FL1 and F12, current flows through capacitor C6 and diode D8. During each negative half-cycle, current flows through capacitor C6, diode D9, resistor R7 and either resistor R8 or series connected diodes D10 and D11.

At low current levels, the voltage drop across resistor R8 is too small to turn on diodes D10 and D11. In this case, the voltage (−ERROR) varies proportionally with the lamp current and the sum of the resistances R7 and R8. At larger currents, diodes D10 and D11 turn on and provide a substantially constant voltage drop that is independent of the lamp current ($i_{FL}$). The voltage (−ERROR) in this case, varies proportionally with the lamp current and the resistance R7.

Figure 12:
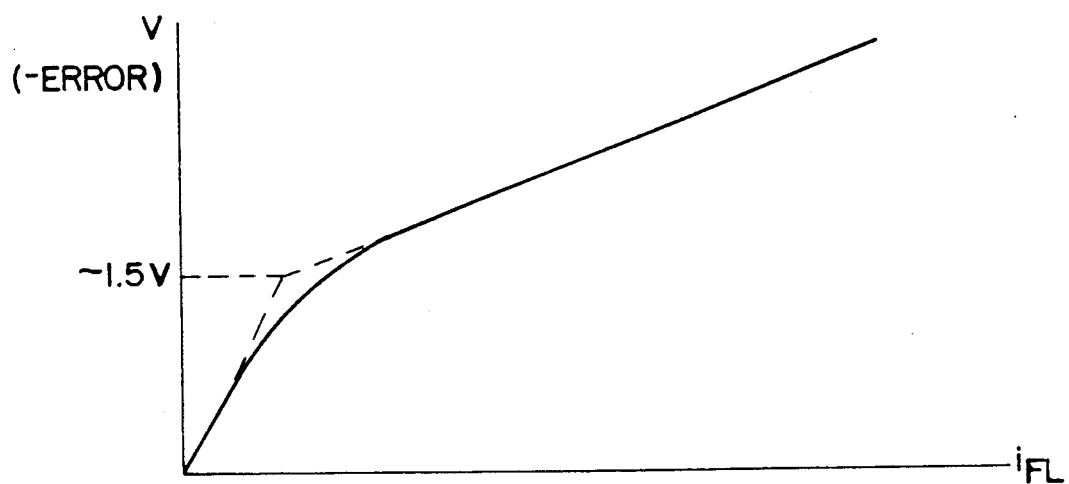
FIG. 12 is a graph showing preferred characteristics of a current sensing circuit of the present invention.

FIG. 12 shows the resulting relationship between lamp current ($i_{FL}$) and the feedback voltage (−ERROR). The dual slope characteristic of this relationship allows for high sensitivity and tight control of lamp current at low current levels, resulting in high output impedance at low current levels and low power dissipation in the sense resistors at high current levels. Resistor R7 preferably has less resistance than resistor R8. A resistance ratio of about 4:1 is preferred for full-range control of most types of compact fluorescent lamps. Diodes D8 and D9 are preferably fast recovery diodes. Resistor R14 and capacitor C17 increase the stability of the feedback control system by attenuating any ac voltage components provided to pin 2 of integrated circuit IC1.

Since certain changes may be made in the above described embodiments without departing from the scope of the invention herein involved, it is intended that all matter contained in the above description or shown in the accompanying drawings shall be interpreted in an illustrative and not a limiting sense.

We claim:

1. A control system for providing electrical power from a source to at least one gas discharge lamp comprising:
   a) means for producing a composite current waveform, said waveform comprising an ac current component and a dc current component; and
   b) means for providing said composite current waveform to said at least one lamp;
whereby visible striations in said at least one lamp are substantially eliminated.

2. The control system of claim 1 wherein said ac current component of said composite current waveform is a high frequency ac current component.

3. The control system of claim 1 wherein said ac current component of said composite current waveform is a substantially symmetrical ac current component.

4. The control system of claim 1 wherein said ac current component of said composite current waveform is a substantially symmetrical high frequency ac current component.

5. The control system of claim 1 wherein said ac current component of said composite current waveform is a pulse duration modulated waveform.

6. The control system of claim 1 wherein said ac current component of said composite current waveform is a substantially sinusoidal waveform.

7. The control system of claim 1 wherein said means for producing a composite current waveform comprises:
   a) means for producing an ac current component,
   b) separate means for producing a dc current component; and
   c) means for combining said ac and dc current components to produce said composite current waveform.

8. The control system of claim 1 wherein said dc current component is less than about 5% of the nominal operating current at full rated light output.

9. A control system for providing electrical power from a source to at least one gas discharge lamp, comprising:
   a) means for providing to said at least one lamp an ac component of current at a first frequency; and
   b) means for simultaneously providing to said at least one lamp an ac component of current at a second frequency, substantially lower than said first frequency;
whereby a composite current waveform is established in said at least one lamp which substantially eliminates the occurrence of visible striations.

10. The control system of claim 9 wherein said second frequency is between about 30 Hz and about 5 kHz.

11. The control system of claim 9 wherein said first frequency is higher than about 5 kHz.

12. The control system of claim 11 wherein said ac component of current at said first frequency is a substantially symmetrical ac component of current.

13. The control system of claim 9 wherein said ac component of current at said first frequency is a pulse duration modulated ac component of current.

14. The control system of claim 9 wherein said ac component of current at said first frequency is a substantially sinusoidal component of current.

15. The control system of claim 9 wherein said means for providing an ac component of current at a first frequency and said means for providing an ac component of current at a second frequency are part of a single current providing means.

16. The control system of claim 9 wherein the RMS value of said ac component of current at a second frequency is less than about 5% of the lamp nominal operating RMS current at full rated light output.

17. A control system for operating a gas discharge lamp at light levels below about 40% of nominal light output, comprising: means for producing an ac current in said lamp, said means having an output impedance characteristic of greater than about 5,000 ohm.

18. The control system of claim 17 wherein said ac current is a pulse duration modulated current.

19. The control system of claim 17 wherein said ac current is a substantially sinusoidal current.

20. The control system of claim 17 wherein said ac current is at a high frequency.

21. The control system of claim 17 wherein said ac current is substantially symmetrical.

22. The control system of claim 17 further comprising resistor means for obtaining said output impedance characteristic.

23. The control system of claim 17 further comprising inductor means for obtaining said output impedance characteristic.

24. The control system of claim 17 further comprising capacitor means for obtaining said output impedance characteristic.

25. The control system of claim 17 further comprising resonant circuit means for obtaining said output impedance characteristic.

26. The control system of claim 17 further comprising lamp current control means having current feedback means for obtaining said output impedance characteristic.

27. The control system of claim 25 further comprising lamp current control means having current feedback means for obtaining said output impedance characteristic.

28. The control system of claim 17 wherein said output impedance characteristic is greater than approximately 10,000 ohms.

29. The control system of claim 17 wherein said output impedance characteristic is greater than approximately 35,000 ohms.

30. A control system for op rating a gas discharge lamp at light levels below about 40% of nominal light output, said lamp having a cross section <f average diameter less than about seven-eighths of an in<h, and a voltage/current characteristic which include: at least one region of negative resistance, comprising: means for producing an ac current in said lamp, said means having an output impedance characteristic of greater than about 5,000 ohms.

31. The control system of claim 30 wherein said ac current is a pulse duration modulated current.

32. The control system of claim 30 wherein said ac current is a substantially sinusoidal current.

33. The control system of claim 30 wherein said ac current is at a high frequency.

34. The control system of claim 30 wherein said ac current is substantially symmetrical.

35. The control system of claim 30 further comprising resistor means for obtaining said output impedance characteristic.

36. The control system of claim 30 further comprising inductor means for obtaining said output impedance characteristic.

37. The control system of claim 30 further comprising capacitor means for obtaining said output impedance characteristic.

38. The control system of claim 30 further comprising resonant circuit means for obtaining said output impedance characteristic.

39. The control system of claim 30 further comprising lamp current control means having current feedback means for obtaining said output impedance characteristic.

40. The control system of claim 35, 36, 37, or 38 further comprising lamp current control means having current feedback means for obtaining said output impedance characteristic.

41. The control system of claim 30 wherein said output impedance characteristic is greater than approximately 10,000 ohms.

42. The control system of claim 30 wherein said output impedance characteristic is greater than approximately 35,000 ohms.

43. A control system for operating a gas discharge lamp at light levels below about 40% of nominal light output; said lamp having a voltage/current characteristic which includes at least one region of negative resistance, comprising: means for producing a substantially symmetrical ac current in said lamp, said means having an output impedance characteristic of greater than about 5,000 ohms.

44. The control system of claim 43 wherein said substantially symmetrical ac current is a pulse duration modulated current.

45. The control system of claim 43 wherein said substantially symmetrical ac current is a substantially sinusoidal current.

46. The control system of claim 43 wherein said substantially symmetrical ac current is at a high frequency.

47. The control system of claim 43 further comprising resistor means for obtaining said output impedance characteristic.

48. The control system of claim 43 further comprising inductor means for obtaining said output impedance characteristic.

49. The control system of claim 43 further comprising capacitor means for obtaining said output impedance characteristic.

50. The control system of claim 43 further comprising resonant circuit means for obtaining said output impedance characteristic.

51. The control system of claim 43 further comprising lamp current control means having current feedback means for obtaining said output impedance characteristic.

52. The control system of claim 47, 48, 49, or 50 further comprising lamp current control means having current feedback means for obtaining said output impedance characteristic.

53. The control system of claim 43 wherein said output impedance characteristic is greater than approximately 10,000 ohms.

54. The control system of claim 43 wherein said output impedance characteristic is greater than approximately 35,000 ohms.

55. The control system of claim 43 wherein said lamp has a substantially circular cross section of average diameter less than about seven-eighths inch.

56. The control system of claim 43 further comprising means for producing a dc component of current in said lamp to substantially eliminate visible striations.

57. The control system of claim 43 further comprising means for producing a low frequency ac component of current in said lamp to substantially eliminate visible striations.

58. A control system for operating a gas discharge lamp at light levels below about 40% of nominal light output, said lamp having a maximum negative resistance greater than about 330 ohms, comprising: means for producing an ac current in said lamp, said means having an output impedance characteristic of greater than about 5,000 ohms.

59. The control system of claim 58 wherein said ac current is a pulse duration modulated current.

60. The control system of claim 58 wherein said ac current is a substantially sinusoidal current.

61. The control system of claim 58 wherein said ac current is at a high frequency.

62. The control system of claim 58 wherein said ac current is substantially symmetrical.

63. The control system of claim 58 further comprising resistor means for obtaining said output impedance characteristic.

64. The control system of claim 58 further comprising inductor means for obtaining said output impedance characteristic.

65. The control system of claim 58 further comprising capacitor means for obtaining said output impedance characteristic.

66. The control system of claim 58 further comprising resonant circuit means for containing said output impedance characteristic.

67. The control system of claim 58 further comprising lamp current control means having current feedback means for obtaining said output impedance characteristic.

68. The control system of claim 63, 64, 65, or 66 further comprising lamp current control means having current feedback means for obtaining said output impedance characteristic.

69. The control system of claim 58 wherein said output impedance characteristic is greater than approximately 10,000 ohms.

70. The control system of claim 58 wherein said output impedance characteristic is greater than approximately 35,000 ohms.

71. A control system for operating a gas discharge lamp at light levels below about 40% of nominal light output, said lamp having a cross section of average diameter less than about seven-eighths of an inch, and a voltage/current characteristic which include: at least one region of negative resistance, comprising: means for producing a substantially symmetrical ac current in said lamp, said means having an output impedance characteristic of greater than about 5,000 ohms.

72. The control system of claim 71 wherein said substantially symmetrical ac current is a pulse duration modulated current.

73. The control system of claim 71 wherein said substantially symmetrical ac current is a substantially sinusoidal current.

74. The control system of claim 71 wherein said substantially symmetrical ac current is at a high frequency.

75. The control system of claim 71 further comprising resistor means for obtaining said output impedance characteristic.

76. The control system of claim 71 further comprising inductor means for obtaining said output impedance characteristic.

77. The control system of claim 71 further comprising capacitor means for obtaining said output impedance characteristic.

78. The control system of claim 71 further comprising resonant circuit means for obtaining said output impedance characteristic.

79. The control system of claim 71 further comprising lamp current control means having current feedback means for obtaining said output impedance characteristic.

80. The control system of claim 75, 76, 77, or 78 further comprising lamp current control means having current feedback means for obtaining said output impedance characteristic.

81. The control system of claim 71 wherein said output timpedance characteristic is greater than approximately 10,000 ohms.

82. The control system of claim 71 wherein said output impedance characteristic is greater than approximately 35,000 ohms.

83. A control system for op rating a gas discharge lamp at light levels below about 40% of nominal light output, said control system having a maximum output impedance characteristic of at least about 5,000 ohms and comprising:
  a) a high frequency source having a relatively low output impedance;
  b) at least one passive impedance element connected in series between said source and said lamp;
  c) current sensing means for sensing an actual current in said lamp; and
  d) amplifier means responsive to said current sensing means for increasing the effective output impedance characteristic of said control system beyond that of said passive impedance element alone.

84. The control system of claim 83 wherein said high frequency source is a pulse duration modulated source.

85. The control system of claim 83 wherein said high frequency source is a substantially sinusoidal source.

86. The control system of claim 83 wherein the output impedance of said high frequency source is less than about 500 ohms.

87. The control system of claim 83 wherein said passive impedance element has an impedance of less than about 4,500 ohms.

88. The control system of claim 83 wherein said lamp has a substantially circular cross section, said cross section having a diameter of less than about seven-eighths inch.

89. The control system of c[aim 83 wherein said high frequency source is a substantially symmetrical high frequency source.

90. The control system of claim 83 further comprising means for producing a dc component of current in said lamp to substantially eliminate visible striations.

91. The control system of claim 83 further comprising means for producing a low frequency ac component of current in said lamp to substantially eliminate visible striations.

92. The control system of claim 83 wherein said output impedance characteristic is greater than approximately 10,000 ohms.

93. The control system of claim 83 wherein said output impedance characteristic is greater than approximately 35,000 ohms.

94. A control system for operating a gas discharge lamp at light levels below about 40% of nominal light output, said control system having a maximum output impedance characteristic of at least about 5,000 ohms and comprising:
  a) a high frequency source having a relatively low output impedance;
  b) at least one passive impedance element connected in series between said source and at least one lamp;
  c) means for sensing an actual current in said lamp and producing a first signal indicative of said actual lamp current;
  d) means for comparing said first signal to a reference value and producing a second signal indicative of the difference between said first signal and said reference value; and
  e) means responsive to said second signal for adjusting said high frequency source such that the difference between said first signal and said reference value tends towards zero.

95. The control system of claim 94 wherein said high frequency source is a pulse duration modulated source.

96. The control system of claim 94 wherein said high frequency source is a substantially sinusoidal source.

97. The control system of claim 94 wherein the output impedance of said high frequency source is less than about 500 ohms.

98. The control system of claim 94 wherein said passive impedance element has an impedance of less than about 4,500 ohms.

99. The control system of claim 94 wherein said lamp has a substantially circular cross section of average diameter less than about seven-eighths inch.

100. The control system of claim 94 wherein the output waveform of said high frequency source is substantially symmetrical.

101. The control system of claim 94 further comprising means for producing a dc component of current in said lamp to substantially eliminate visible striations.

102. The control system of claim 94 further comprising means for producing a low frequency ac component of current in said lamp to substantially eliminate visible striations.

103. The control system of claim 94 wherein said output impedance characteristic is greater than approximately 10,000 ohms.

104. The control system of claim 94 wherein said output impedance characteristic is greater than approximately 35,000 ohms.

105. A method of substantially eliminating the occurrence of visible striations in a gas discharge lamp, comprising the steps of:
  a) providing to said lamp ac current to strike and maintain an electric discharge therethrough; and b) simultaneously providing to said lamp a dc component of current;

whereby a composite current waveform is established in the lamp which substantially eliminates the occurrence of visible striations.

106. A method of substantially eliminating the occurrence of visible striations in a gas discharge lamp comprising the steps of:
   a) providing to said lamp an ac component of current at a first frequency;
   b) simultaneously providing to said lamp an ac component of current at a second frequency substantially lower than said first frequency;

whereby a composite ac current waveform is established in said lamp which substantially eliminates the occurrence of visible striations.

107. A method of substantially eliminating the occurrence of visible striations in a gas discharge lamp comprising the steps of:
   a) generating an ac current at a first frequency;
   b) generating an ac current at a second frequency substantially lower than said first frequency;
   c) adding together said first and second frequency ac currents to obtain a composite ac current; and
   d) providing said composite ac current to said gas discharge lamp to substantially eliminate the occurrence of visible striations.

* * * * *

REEXAMINATION CERTIFICATE (2909th)
United States Patent [19]
Sullivan et al.

[11] B1 5,041,763
[45] Certificate Issued Jun. 11, 1996

[54] CIRCUIT AND METHOD FOR IMPROVED DIMMING OF GAS DISCHARGE LAMPS

[75] Inventors: Charles R. Sullivan; Joel S. Spira, both of Coopersburg; David G. Luchaco, Macungie; Scott R. Jurell, Hellerton; Eric R. Motto, Center Valley, all of Pa.

[73] Assignee: Lutron Electronics Co., Inc., Coopersburg, Pa.

Reexamination Request:
No. 90/004,061, Dec. 21, 1995

Reexamination Certificate for:
| | |
|---|---|
| Patent No.: | 5,041,763 |
| Issued: | Aug. 20, 1991 |
| Appl. No.: | 553,201 |
| Filed: | Jul. 13, 1990 |

Related U.S. Application Data

[63] Continuation-in-part of Ser. No. 455,644, Dec. 22, 1989, Pat. No. 5,001,386.

[51] Int. Cl.⁶ .................................................. H05B 41/38
[52] U.S. Cl. ...................... 315/176; 315/307; 315/DIG. 4
[58] Field of Search ............................... 315/160, 171, 315/174, 175, 176, 227 R, 283, 291, 297, 301, 307, 308, 311, 219, DIG. 4

[56] References Cited

U.S. PATENT DOCUMENTS

| | | | |
|---|---|---|---|
| 4,682,082 | 7/1987 | MacAskill et al. | 315/219 |
| 5,055,742 | 10/1991 | Jurell et al. | 315/94 |
| 5,113,085 | 5/1992 | Schäfer et al. | 307/239 |
| 5,144,205 | 9/1992 | Motto et al. | 315/244 |

FOREIGN PATENT DOCUMENTS

| | | |
|---|---|---|
| 0336642A1 | 10/1989 | European Pat. Off. . |
| 0390285A2 | 10/1990 | European Pat. Off. . |
| 0415490A2 | 3/1991 | European Pat. Off. . |
| 543136 | 11/1941 | United Kingdom . |
| 1202505 | 8/1970 | United Kingdom . |
| 1358829 | 7/1974 | United Kingdom . |
| 1487584 | 10/1977 | United Kingdom . |
| 2001811 | 2/1979 | United Kingdom . |
| 2232543 | 12/1990 | United Kingdom . |

*Primary Examiner*—David Mis

[57] ABSTRACT

A dimming circuit provides power from an ac source to a compact fluorescent lamp. The circuit generally includes a resonant circuit driven by a high-frequency switching inverter and a current feedback control system. The circuit is essentially an ac current source of unusually high impedance and provides substantially symmetrical high-frequency current to the lamp. This allows flicker-free dimming of compact fluorescent lamps over a wide range with good light output stability. A small amount of dc or low-frequency ac current may be simultaneously provided to the lamp. The resulting composite current waveform flowing through the lamp substantially eliminates visible striations over a dimming range from about 100% to 1% of full light output.

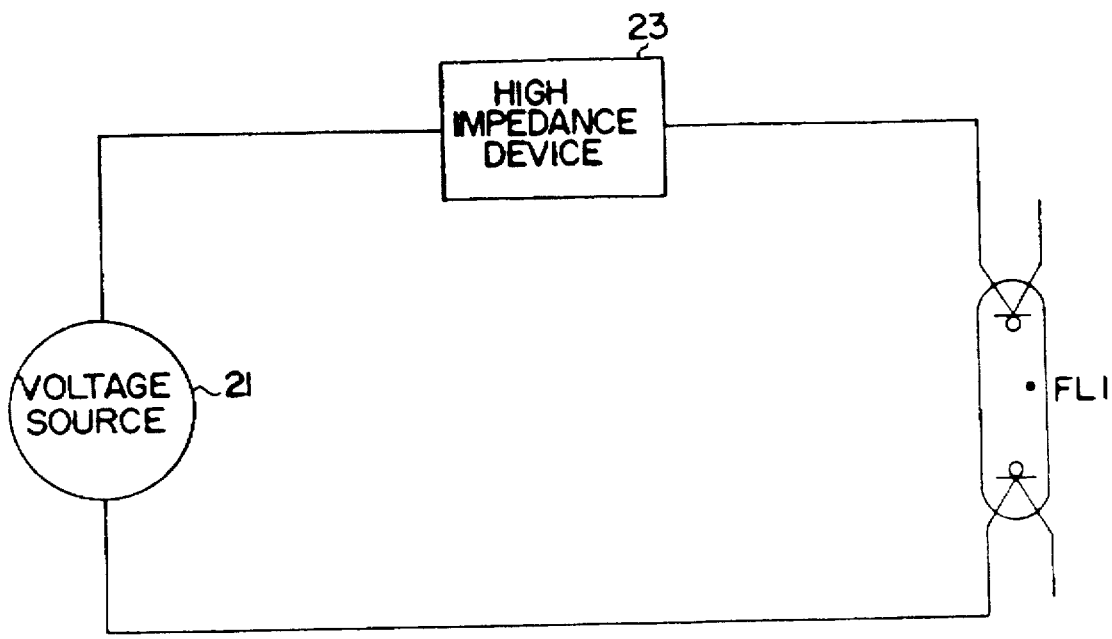

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 83–103 and 104 is confirmed.

Claims 26, 27, 39, 51, 67 and 79 are cancelled.

Claims 1, 7, 9, 17, 22–25, 30, 35–38, 40, 43, 47–50, 52, 58, 63–66, 68, 71, 75–78, 80, 105, 106 and 107 are determined to be patentable as amended.

Claims 2–6, 8, 10–16, 18–21, 28, 29, 31–34, 41, 42, 44–46, 53–57, 59–62, 69, 70, 72–74, 81 and 82, dependent on an amended claim, are determined to be patentable.

New claims 108–115 and 116 are added and determined to be patentable.

1. A control system for providing electrical power from a source to at least one gas discharge lamp comprising:
   a) means for producing a composite current waveform, said waveform comprising an ac current component and a dc current component, *said means having an output impedance characteristic of greater than about 5,000 ohms*; and
   b) means for providing said composite current waveform to said at least one lamp;
whereby visible striations in said at least one lamp are substantially eliminated.

7. The control system of claim 1 wherein said means for producing a composite current waveform *further* comprises:
   a) means for producing an ac current component[.];
   b) separate means for producing a dc current component; and
   c) means for combining said ac and dc current components to produce said composite current waveform.

9. A control system for providing electrical power from a source to at least one gas discharge lamp, comprising:
   a) means for providing to said at least one lamp an ac component of current at a first frequency, *said means having an output impedance characteristics of greater than about 5,000 ohms*; and
   b) means for simultaneously providing to said at least one lamp an ac component of current at a second frequency, substantially lower than said first frequency;
whereby a composite current waveform is established in said at least one lamp which substantially eliminates the occurrence of visible striations.

17. A control system for operating a gas discharge lamp at light levels below about 40% of nominal light output, comprising: means for producing an ac current in said lamp, said means having an output impedance characteristic of greater than about 5,000 ohm *and including lamp current control means having current feedback means for obtaining said output impedance characteristic*.

22. The control system of claim 17 [further comprising], *wherein said lamp current control means includes* resistor means for obtaining said output impedance characteristic.

23. [The control system of claim 17 further comprising] *A control system for operating a gas discharge lamp at light levels below about 40% of nominal light output, comprising: means for producing an ac current in said lamp, said means having an output impedance characteristic of greater than about 5,000 ohm; and including* inductor means for obtaining said output impedance characteristic.

24. [The control system of claim 17 further comprising] *A control system for operating a gas discharge lamp at light levels below about 40% of nominal light output, comprising: means for producing an ac current in said lamp, said means having an output impedance characteristic of greater than about 5,000 ohm; and including* capacitor means for obtaining said output impedance characteristic.

25. [The control system of claim 17 further comprising] *A control system for operating a gas discharge lamp at light levels below about 40% of nominal light output, comprising: means for producing an ac current in said lamp, said means having an output impedance characteristic of greater than about 5,000 ohm; and including* resonant circuit means for obtaining said output impedance characteristic.

30. A control system for operating a gas discharge lamp at light levels below about 40% of nominal light output, said lamp having a cross section [<f] *of* average diameter less than about seven-eighths of an [in<h,] *inch* and a voltage/current characteristic which [nclude:] *includes* at least one region of negative resistance, comprising: means for producing an ac current in said lamp, said means having an output impedance characteristic of greater than about 5,000 ohms *and including lamp current control means having current feedback means for obtaining said output impedance characteristic*.

35. The control system of claim 30 [further comprising], *wherein said lamp current control means includes* resistor means for obtaining said output impedance characteristic.

36. [The control system of claim 30 further comprising] *A control system for operating a gas discharge lamp at light levels below about 40% of nominal light output, said lamp having a cross section of average diameter less than about seven-eighths of an inch and a voltage/current characteristic which includes at least one region of negative resistance, comprising: means for producing an ac current in said lamp, said means having an output impedance characteristic of greater than about 5,000 ohms; and including* inductor means for obtaining said output impedance characteristic.

37. [The control system of claim 30 further comprising] *A control system for operating a gas discharge lamp at light levels below about 40% of nominal light output, said lamp having a cross section of average diameter less than about seven-eighths of an inch and a voltage/current characteristic which includes at least one region of negative resistance, comprising: means for producing an ac current in said lamp, said means having an output impedance characteristic of greater than about 5,000 ohms; and including* capacitor means for obtaining said output impedance characteristic.

38. [The control system of claim 30 further comprising] *A control system for operating a gas discharge lamp at light levels below about 40% of nominal light output, said lamp having a cross section of average diameter less than about seven-eighths of an inch and a voltage/current characteristic which includes at least one region of negative resistance, comprising: means for producing an ac current in said lamp, said means having an output impedance characteirstic of greater than about 5,000 ohms; and including* resonant circuit means for obtaining said output impedance characteristic.

40. The control system of claim [35,] 36, 37, or 38 further comprising lamp current control means having current feedback means for obtaining said output impedanace characteristics.

43. A control system for operating a gas discharge lamp at light levels below about 40% of nominal light output, said lamp having a voltage/current characteristic which includes at least one region of negative resistance, comprising: means for producing a substantially symmetrical ac current in said lamp, said means having an output impedance characteristic greater than about 5,000 ohms *and including lamp current control means having current feedback means for obtaining said output impedance characteristic.*

47. The control system of claim 43 [further comprising], *wherein said lamp current control means includes* resistor means for obtaining said output impedance characteristic.

48. [The control system of claim 43 further comprising] *A control system for operating a gas discharge lamp at light levels below about 40% of nominal light output, said lamp having a voltage/current characteristic which includes at least one region of negative resistance, comprising: means for producing a substantially symmetrical ac current in said lamp, said means having an output impedance characteristic greater than about 5,000 ohms; and including* inductor means for obtaining said output impedance characteristic.

49. [The control system of claim 43 further comprising] *A control system for operating a gas discharge lamp at light levels below about 40% of nominal light output, said lamp having a voltage/current characteristic which includes at least one region of negative resistance, comprising: means for producing a substantially symmetrical ac current in said lamp, said means having an output impedance characteristic greater than about 5,000 ohms; and including* capacitor means for obtaining said output impedance characteristic.

50. [The control system of claim 43 further comprising] *A control system for operating a gas discharge lamp at light levels below about 40% of nominal light output, said lamp having a voltage/current characteristic which includes at least one region of negative resistance, comprising: means for producing a substantially symmetrical ac current in said lamp, said means having an output impedance characteristic greater than about 5,000 ohms; and including* resonant circuit means for obtaining said output impedance characteristic.

52. The control system of claim [47,] 48, 49, or 50 further comprising lamp current control means having current feedback means for obtaining said output impedance characteristic.

58. A control system for operating a gas discharge lamp at light levels below about 40% of nominal light output, said lamp having a maximum negative resistance greater than about 330 ohms, comprising: means for producing an ac current in said lamp, said means having an output impedance characteristic greater than about 5,000 ohms *and including lamp current control means having current feedback means for obtaining said output impedance characteristic.*

63. The control system of claim 58 [further comprising], *wherein said lamp current control means includes* resistor means for obtaining said output impedance characteristic.

64. [The control system of claim 58 further comprising] *A control system for operating a gas discharge lamp at light levels below about 40% of nominal light output, said lamp having a maximum negative resistance greater than about 330 ohms, comprising: means for producing an ac current in said lamp, said means having an output impedance characteristic greater than about 5,000 ohms; and including* inductor means for obtaining said output impedance characteristic.

65. [The control system of claim 58 further comprising] *A control system for operating a gas discharge lamp at light levels below about 40% of nominal light output, said lamp having a maximum negative resistance greater than about 330 ohms, comprising: means for producing an ac current in said lamp, said means having an output impedance characteristic greater than about 5,000 ohms; and including* capacitor means for obtaining said output impedance characteristic.

66. [The control system of claim 58 further comprising] *A control system for operating a gas discharge lamp at light levels below about 40% of nominal light output, said lamp having a maximum negative resistance greater than about 330 ohms, comprising: means for producing an ac current in said lamp, said means having an output impedance characteristic greater than about 5,000 ohms; and including* resonant circuit means for obtaining said output impedance characteristic.

68. The control system of claim [63,] 64, 65, or 66 further comprising lamp current control means having current feedback means for obtaining said output impedance characteristic.

71. A control system for operating a gas discharge lamp at light levels below about 40% of nominal light output, said lamp having a cross section of average diameter less than about seven-eighths of an inch, and a voltage/current characteristic which [include:] *includes* at least one region of negative resistance, comprising: means for producing a substantially symmetrical ac current in said lamp, said means having an output impedance characteristic of greater than about 5,000 ohms *and including lamp current control means having current feedback means for obtaining said output impedance characteristic.*

75. The control system of claim 71 [further comprising], *wherein said lamp current control means includes* resistor means for obtaining said output impedance characteristic.

76. [The control system of claim 71 further comprising] *A control system for operating a gas discharge lamp at light levels below about 40% of nominal light output, said lamp having a cross section of average diameter less than about seven-eighths of an inch, and a voltage/current characteristic which includes at least one region of negative resistance, comprising: means for producing a substantially symmetrical ac current in said lamp, said means having an output impedance characteristic of greater than about 5,000 ohms; and including* inductor means for obtaining said output impedance characteristic.

77. [The control system of claim 71 further comprising] *A control system for operating a gas discharge lamp at light levels below about 40% of nominal light output, said lamp having a cross section of average diameter less than about seven-eighths of an inch, and a voltage/current characteristic which includes at least one region of negative resistance, comprising: means for producing a substantially symmetrical ac current in said lamp, said means having an output impedance characteristic of greater than about 5,000 ohms; and including* capacitor means for obtaining said output impedance characteristic.

78. [The control system of claim 71 further comprising] *A control system for operating a gas discharge lamp at light levels below about 40% of nominal light output, said lamp having a cross section of average diameter less than about seven-eighths of an inch, and a voltage/current characteristic which includes at least one region of negative resis-* tance, comprising: means for producing a substantially symmetrical ac current in said lamp, said means having an output impedance characteristic of greater than about 5,000 ohms; and including resonant circuit means for obtaining said output impedance characteristic.

80. The control system of claim [75,] 76, 77, or 78 further comprising lamp current control means having current feedback means for obtaining said output impedance characteristic.

105. A method of substantially eliminating the occurrence of visible striations in a gas discharge lamp, comprising the steps of:

a) providing to said lamp ac current *through an ac current source having an output impedance characteristic of greater than about 5,000 ohms and having current feedback means for obtaining said output impedance,* said ac current being sufficient to strike and maintain an electric discharge therethrough; and b) simultaneously providing to said lamp a dc component of current;

whereby a composite current waveform is established in the lamp which substantially eliminates the occurrence of visible striations.

106. A method of substantially eliminating the occurrence of visible striations in a gas discharge lamp comprising the steps of:

a) providing to said lamp *through an ac current source having an output impedance characteristic of greater than about 5,000 ohms and having current feedback means for obtaining said output impedance* an ac component of current at a first frequency;

b) simultaneously providing to said lamp an ac component of current at a second frequency substantially lower than said first frequency;

whereby a composite ac current waveform is established in said lamp which substantially eliminates the occurrence of visible striations.

107. A method of substantially eliminating the occurrence of visible striations in a gas discharge lamp comprising the steps of:

a) generating *through an ac current source having an output impedance characteristic of greater than about 5,000 ohms and having current feedback means for obtaining said output impedance* an ac current at a first frequency;

b) generating an ac current at a second frequency substantially lower than the first frequency;

c) adding together said first and second frequency ac currents to obtain a composite ac current; and d) providing said composite ac current to said gas discharge lamp to substantially eliminate the occurrence of visible striations.

*108. The control system of claim 1, wherein said output impedance characteristic is obtained by a substantially non-dissipative element associated with siad lamp current control means.*

*109. The control system of claim 1, wherein said output impedance characteristic is obtained by current feedback means associated with said lamp current control means.*

*110. The control system of claim 9, wherein said output impedance characteristic is obtained by a substantially non-dissipative element associated with said lamp current control means.*

*111. The control system of claim 9, wherein said output impedance characteristic is obtained by current feedback means associated with said lamp current control means.*

*112. A control system for operating a gas discharge lamp at light levels below about 40% of nominal light output, comprising: means for producing an ac current in said lamp, said means having an output impedance characteristic of greater than about 5,000 ohm, wherein said output impedance characteristic is obtained by a substantially non-dissipative element associated with said lamp current control means.*

*113. A control system for operating a gas discharge lamp at light levels below about 40% of nominal light output, said lamp having a cross section of average diameter less than about seven-eighths of an inch and a voltage/current characteristic which includes at least one region of negative resistance, comprising: means for producing an ac current in said lamp, said means having an output impedance characteristic of greater than about 5,000 ohms, wherein said output impedance characteristic is obtained by a substantially non-dissipative element associated with said lamp current control means.*

*114. A control system for operating a gas discharge lamp at light levels below about 40% of nominal light output, said lamp having a voltage/current characteristic which includes at least one region of negative resistance, comprising: means for producing a substantially symmetrical ac current in said lamp, said means having an output impedance characteristic greater than about 5,000 ohms, wherein said output impedance characteristic is obtained by a substantially non-dissipative element associated with said lamp current control means.*

*115. A control system for operating a gas dicharge lamp at light levels below about 40% of nominal light output, said lamp having a maximum negative resistance greater than about 330 ohms, comprising: means for producing an ac current in said lamp, said means having an output impedance characteristic greater than about 5,000 ohms, wherein said output impedance characteristic is obtained by a substantially non-dissipative element associated with said lamp current control means.*

*116. A control system for operating a gas discharge lamp at light levels below about 40% of nominal light output, said lamp having a cross section of average diameter less than about seven-eighths of an inch, and a voltage/current characteristic which includes at least one region of negative resistance, comprising: means for producing a substantially symmetrical ac current in said lamp, said means having an output impedance characteristic of greater than about 5,000 ohms, wherein said output impedance characteristic is obtained by a substantially non-dissipative element associated with said lamp current control means.*

\* \* \* \* \*